(12) United States Patent
Doi

(10) Patent No.: US 8,558,879 B2
(45) Date of Patent: Oct. 15, 2013

(54) ENDOSCOPE APPARATUS AND MEASURING METHOD

(75) Inventor: Takahiro Doi, Tokyo (JP)

(73) Assignee: Olympus Corporation, Tokyo (JP)

( * ) Notice: Subject to any disclaimer, the term of this patent is extended or adjusted under 35 U.S.C. 154(b) by 619 days.

(21) Appl. No.: 12/730,740

(22) Filed: Mar. 24, 2010

(65) Prior Publication Data

US 2011/0018987 A1   Jan. 27, 2011

(30) Foreign Application Priority Data

Jul. 23, 2009   (JP) ................ P2009-172175

(51) Int. Cl.
*A62B 1/04*   (2006.01)
*G06K 9/00*   (2006.01)

(52) U.S. Cl.
USPC ............................ 348/65; 382/131; 382/132

(58) Field of Classification Search
USPC ..................... 348/65; 382/131–132
See application file for complete search history.

(56) References Cited

U.S. PATENT DOCUMENTS

| 7,551,211 B2 * | 6/2009 | Taguchi et al. ........... 348/239 |
| 2006/0176321 A1 | 8/2006 | Nakano et al. |
| 2006/0178561 A1 | 8/2006 | Nakano et al. |
| 2007/0165306 A1 | 7/2007 | Bendall et al. |
| 2008/0015412 A1 * | 1/2008 | Hori ........................ 600/109 |
| 2010/0317920 A1 * | 12/2010 | Doi et al. ................. 600/109 |

FOREIGN PATENT DOCUMENTS

| JP | 4-332523 A | 11/1992 |
| JP | 10-133639 A | 5/1998 |
| JP | 2005-348870 A | 12/2005 |
| JP | 2006-329684 A | 12/2006 |

* cited by examiner

*Primary Examiner* — David Czekaj
*Assistant Examiner* — Tsion B Owens
(74) *Attorney, Agent, or Firm* — Holtz, Holtz, Goodman & Chick, PC

(57) ABSTRACT

An endoscope apparatus comprises an imaging unit, a measurement point setting unit, a corresponding-point setting unit, a region setting unit, a display unit, and a measuring unit. The imaging unit acquires image data containing a first image and a second image, the first image and the second image being about the same subject to be inspected. The measurement point setting unit sets a measurement point on the first image. The corresponding-point setting unit sets a corresponding point on the second image based on a position of the measurement point. The region setting unit sets an information display region on the second image based on a position of the corresponding point. The display unit displays the first image, the second image, the measurement point, the corresponding point, and the information display region. The measuring unit measures a subject using the image data.

5 Claims, 19 Drawing Sheets

ENDOSCOPE APPARATUS AND MEASURING METHOD

BACKGROUND OF THE INVENTION

1. Field of the Invention

The present invention relates to an endoscope apparatus and a measuring method which execute measurement processing based on image data obtained by imaging a subject by an endoscope.

Priority is claimed on Japanese Patent Application No. 2009-172175, filed Jul. 23, 2009, the content of which is incorporated herein by reference.

2. Description of Related Art

Industrial endoscope apparatuses are used for the observation and inspection of damage or corrosion to the insides of boilers, turbines, engines, pipes, etc. Additionally, there is an endoscope apparatus including a function to measure length, area, etc. according to the principle of triangulation based on a measurement point designated on an image picked up by an endoscope. Additionally, in this endoscope apparatus, various observation objects can be observed and inspected. Therefore, two or more kinds of optical adapters are prepared, and the distal end of the endoscope is adapted to be replaceable.

As the above optical adapters, there is a stereo optical adapter capable of forming two subject images about the same subject. The length, area, etc. of the subject can be measured by using the stereo optical adapter, and obtaining the three-dimensional spatial coordinates of a subject by using the principle of triangulation based on the coordinates of distance calculating points of the right and left optical systems when subject images are captured by the right and left systems.

FIGS. 27 and 28 show a screen (hereinafter referred to as a display screen) displayed by a display device of an endoscope apparatus. FIGS. 27 and 28 are examples of the display screen when the distance between two points is measured (the measurement of the distance between the two points). A left image 910a and a right image 910b corresponding to right and left subject images captured by the stereo optical adapter are displayed on a display screen 900 shown in FIG. 27.

Additionally, cursors 920a and 920b for designating measurement points showing measurement positions are displayed on the display screen 900. A user is able to input a movement instruction of the cursor 920a to the endoscope apparatus, thereby moving the cursors 920a and 920b within the display screen 900.

The display position of the cursor 920a is set based on an instruction input to the endoscope apparatus by the user. When the cursor 920a is set within the left image 910a, the matching process of calculating the position of a corresponding point on the right image 910b corresponding to the display position of the cursor 920a is executed.

The position of the corresponding point becomes the display position of the cursor 920b. Additionally, an image obtained by enlarging a region around the cursor 920a is displayed on a zoom window 930a, and an image obtained by enlarging a region around the cursor 920b is displayed on a zoom window 930b. Similarly, an endoscope apparatus which displays a screen (enlarged screen) obtained by enlarging a region around the display position of a cursor is disclosed in U.S. Patent Application Publication No. 2007-165306.

When the user moves the cursor 920a to a desired position, and inputs an instruction which fixes measurement points, as in FIG. 28, fixed measurement points 940a and 940b are displayed along with cursors 920a and 920b. After a plurality of measurement points is set, a subject is measured based on the positions of the measurement points.

If a measurement point is set in the region where the zoom window 930a is displayed, the cursor 920a overlaps the zoom window 930a. Therefore, setting the measurement point becomes difficult.

As content related to this, U.S. Patent Application Publication No. 2007-165306 discloses that the enlarged screen does not hinder the cursor.

SUMMARY OF THE INVENTION

In one aspect of the present invention, there is provided an endoscope apparatus that includes at least: an imaging unit which acquires image data containing a first image and a second image, the first image and the second image being about the same subject to be inspected; a measurement point setting unit which sets a measurement point on the first image; a corresponding-point setting unit which sets a corresponding point on the second image based on a position of the measurement point set by the measurement point setting unit; a region setting unit which sets an information display region on the second image based on a position of the corresponding point set by the corresponding-point setting unit; a display unit which displays the first image, the second image, the measurement point, the corresponding point, and the information display region; and a measuring unit which measures a subject using the image data based on the position of the measurement point and the position of the corresponding point.

BRIEF DESCRIPTION OF THE DRAWINGS

The above features and advantages of the present invention will be more apparent from the following detailed description of certain preferred embodiments taken in conjunction with the accompanying drawings, in which.

DETAILED DESCRIPTION OF THE PREFERRED EMBODIMENTS

The present invention will be now described herein with reference to illustrative embodiments. Those skilled in the art will recognize that many alternative embodiments can be accomplished using the teachings of the present invention and that the invention is not limited to the embodiments illustrated for explanatory purposes.

Figure 1:
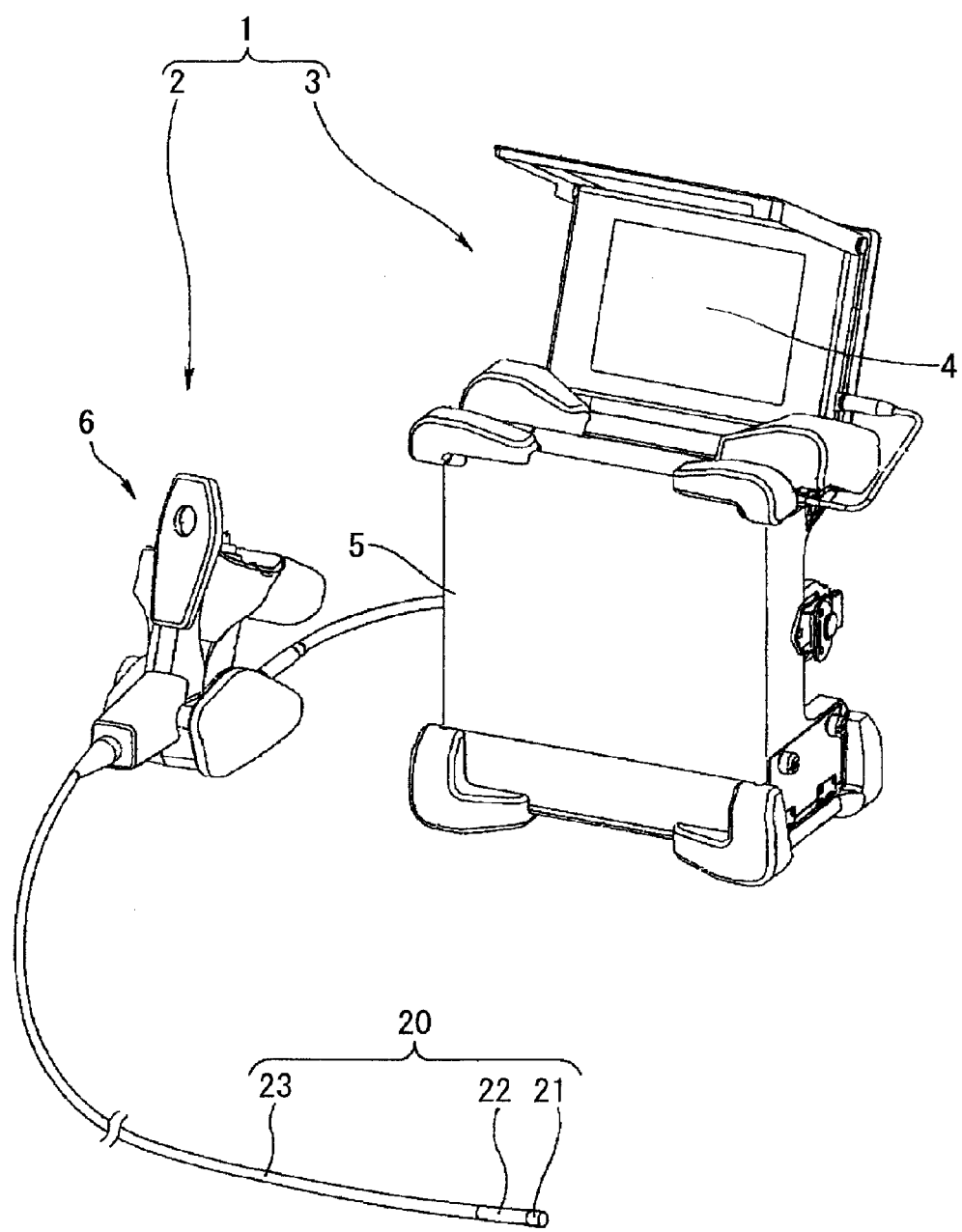
FIG. 1 is a perspective view showing the overall configuration of an endoscope apparatus according to one embodiment of the present invention.

Hereinafter, embodiments of the present invention will be described with reference to the accompanying drawings. FIG. 1 shows the configuration of an endoscope apparatus according to one embodiment of the present invention. As shown in FIG. 1, the endoscope apparatus 1 includes an endoscope 2 and a main body 3 connected to the endoscope 2. The endoscope 2 includes an elongated insertion portion 20, and an operation portion 6 for performing control operation of the apparatus. The main body 3 includes a monitor 4 (LCD monitor) that is a display device which displays an image of a subject picked up by the endoscope 2, information (for example, operation menu) related to operation, and a housing 5 which has a control unit 10 (refer to FIG. 2) therein.

The insertion portion 20 is constructed such that a hard distal end 21, a bending portion 22 which can be bent, for example, vertically and horizontally, and a flexible tube portion 23 which has pliability are continuously provided sequentially from a distal side. Various optical adapters, such as a stereo optical adapter having two observation fields of view and one optical adapter having one observation field of view are adapted to be attachable to and detachable from the distal end 21 of the insertion portion 20. In the present embodiment, when measurement is performed, a left image and right image that are one pair of right and left subject images are picked up through the stereo optical adapter which can form two subject images of the same subject.

Figure 2:
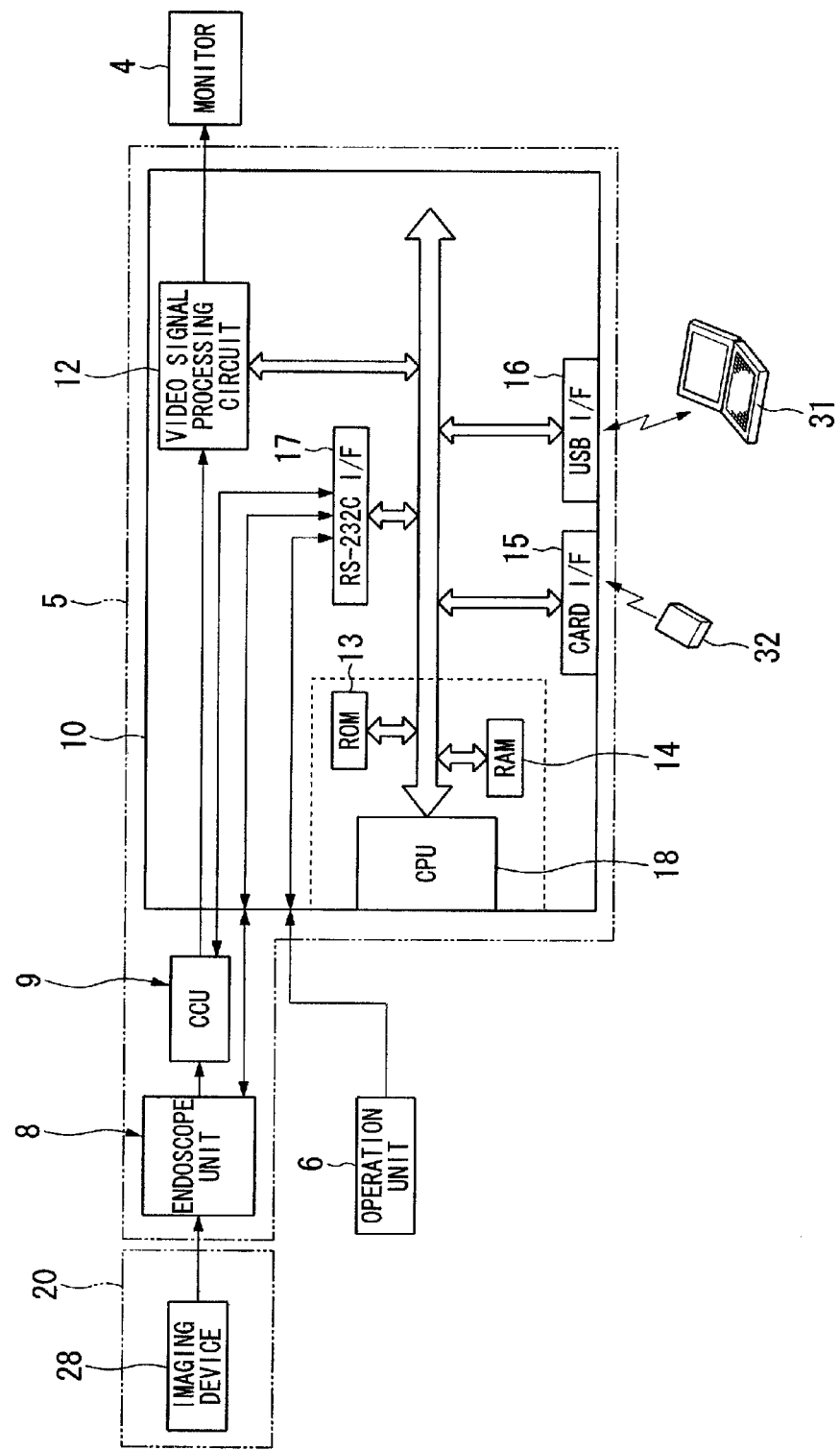
FIG. 2 is a block diagram showing the internal configuration of the endoscope apparatus according to one embodiment of the present invention.

As shown in FIG. 2, an endoscope unit 8, a CCU 9 (camera control unit), and a control unit 10 are provided within the housing 5. A proximal end of the insertion portion 20 is connected to the endoscope unit 8. The endoscope unit 8 includes a light source driving device which drives a light source (LED 29) built in the distal end 21 of the insertion portion 20, and a bending device which bends the bending portion 22 which constitutes the insertion portion 20.

An imaging device 28 and an LED 29 are built in the distal end 21 of the insertion portion 20. The imaging device 28 photoelectrically converts a subject image which is formed via the optical adapter, and creates image signals. The image signals output from the imaging device 28 are input to the CCU 9. This image signals are converted into video signals (image data), such as an NTSC signal, within the CCU 9, and supplied to the control unit 10. The LED 29 emits illumination light. In the present embodiment, the LED 29 is built in the distal end 21 of the insertion portion 20. However, the LED 29 may be arranged within the housing 5 so that the illumination light generated by the LED 29 is guided to the distal end 21 of the insertion portion 20 through an optical fiber. Additionally, illumination other than the LED may be used.

A video signal processing circuit 12 to which the video signals are input, a ROM 13, a RAM 14, a card I/F 15 (card interface), a USB I/F 16 (USB interface), an RS-232 C I/F 17 (RS-232C interface), and a CPU 18 which execute these various functions based on a program, and control the endoscope apparatus 1 are provided within the control unit 10.

The CCU 9 and the endoscope unit 8 are connected to the RS-232 C I/F 17, and the operation portion 6 which performs control and operation instruction of, for example, the CCU 9, endoscope unit 8 are connected to the RS-232 C I/F 17. When a user operates the operation portion 6, the communication required when the CCU 9 and the endoscope unit 8 are controlled is performed according to the kind of operation being done.

The USB I/F 16 is an interface for eclectically connecting the control unit 10 and a personal computer 31 together. By connecting the control unit 10 and the personal computer 31 together via the USB I/F 16, it is possible to perform various kinds of instructions, such as an instruction which displays an endoscope image on the personal computer 31, and image processing during measurement. Additionally, it is possible to output and input, for example, information, data for control required for various kinds of processing between the control unit 10 and the personal computer 31.

Additionally, a memory card 32 can be freely attached and detached to the card I/F 15. By mounting the memory card 32 on the card I/F 15, according to the control by the CPU 18, it is possible to perform the importing of information or data, such as image data, for control stored in the memory card 32, to the control unit 10, and the recording of information or data, such as image data, for control to the memory card 32.

The video signal processing circuit 12 performs the processing of synthesizing graphic image signals based on the operation menu, which are created by the control of the CPU 18, and the video signals from the CCU 9, the processing required for display onto, for example, a screen of the monitor 4 in order to display a synthetic image obtained by synthesizing the endoscope image based on the video signals supplied from the CCU 9, and an operation menu by graphics, and supplies display signals to the monitor 4. Additionally, the video signal processing circuit 12 can also perform the processing for displaying the endoscope image alone, or displaying an image, such as the operation menu, independently. Accordingly, an endoscope image, an operation menu, a synthetic image of the endoscope image and the operation menu, etc. are displayed on the screen of the monitor 4.

The CPU 18 executes the program stored in the ROM 13 to control various circuit components to perform the processing according to a purpose, thereby controlling the endoscope apparatus 1. The RAM 14 is used as a working area for the temporary storage of data by the CPU 18.

Figure 3:
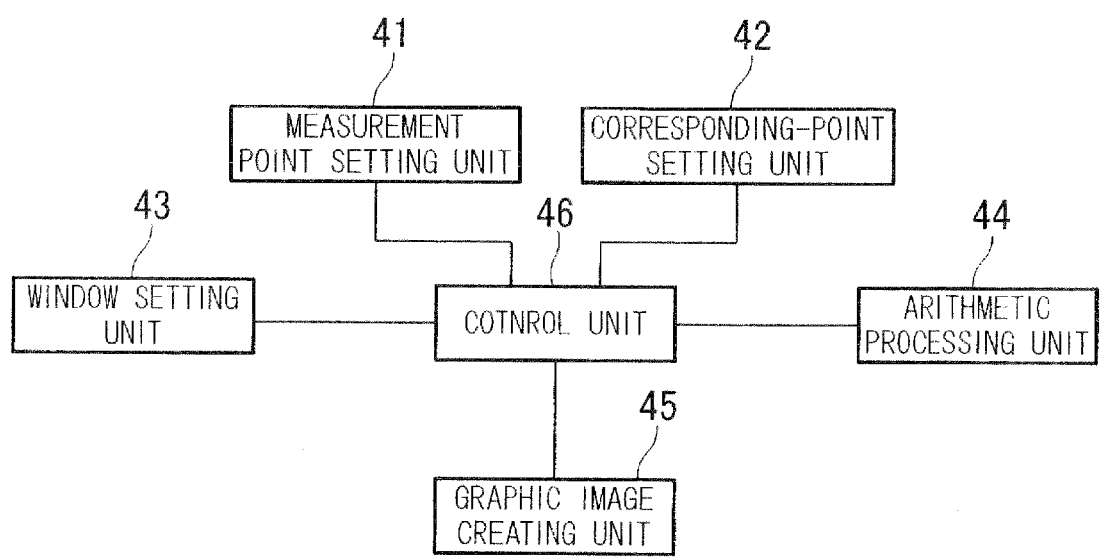
FIG. 3 is a block diagram showing the functional configuration of a CPU provided in the endoscope apparatus according to one embodiment of the present invention.

FIG. 3 shows the functional configuration of the portion of the CPU 18 which becomes central to the description of the present embodiment. A measurement point setting unit 41 sets a measurement point (a first overlay) showing a measurement position on a left image based on image data. A corresponding-point setting unit 42 sets a corresponding point (the first overlay) on a right image based on the image data, based on the position of the measurement point set by the measurement point setting unit 41. At this time, the corresponding-point setting unit 42 executes the matching process of calculating the position of the corresponding point on the right image corresponding to the display position of the measurement point on the left image by pattern matching an image. A window setting unit 43 sets a zoom window (a second overlay), including an image obtained by enlarging a region around the display position of a cursor, on the right image and the left image. The display position of the zoom window on the right image corresponding to the cursor on the right image is set based on the position of the corresponding point on the right image.

The arithmetic processing unit 44 executes the processing of calculating three-dimensional coordinates based on the principle of triangulation, the processing of calculating the length, area, etc. of, for example, a subject, using the image data acquired from the video signal processing circuit 12. An image creating unit 45 creates graphic image signals for displaying icons showing measurement points and corresponding points, zoom windows, various menus, etc. The control unit 46 assigns the respective processings of the measurement point setting unit 41, a corresponding-point setting unit 42, a window setting unit 43, an arithmetic processing unit 44, and a graphic image creating unit 45, and controls the endoscope apparatus 1.

Figure 26:
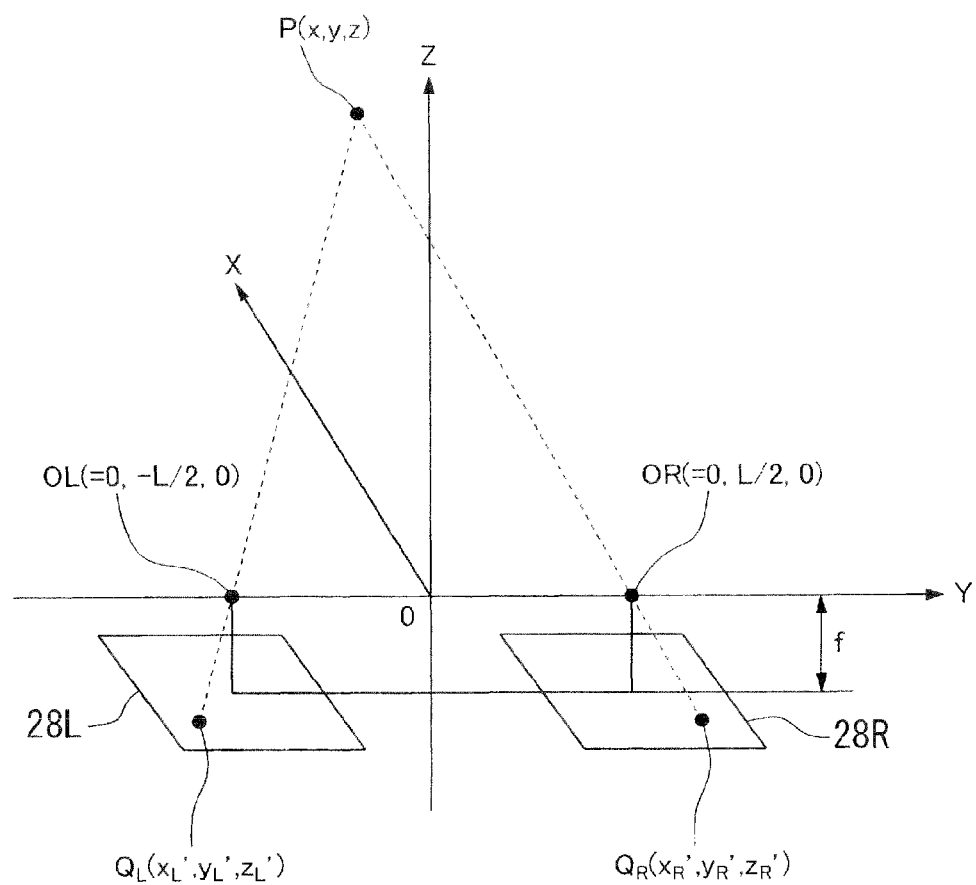
FIG. 26 is a reference view for explaining how to obtain three-dimensional coordinates of a measurement point by stereo measurement.
Figure 27:
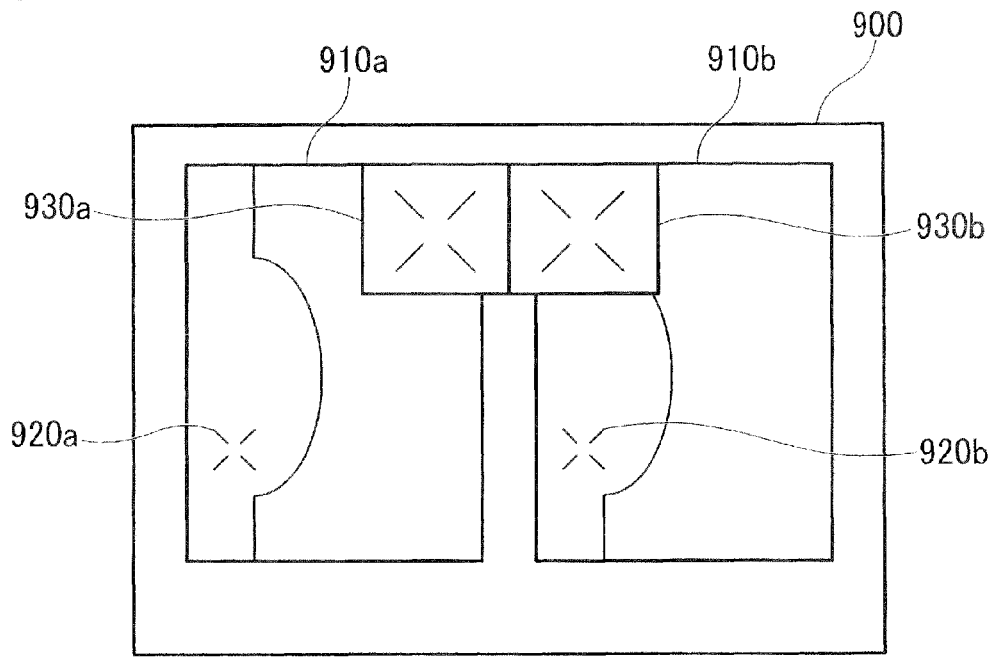
FIG. 27 is a reference view showing a display screen of a conventional endoscope apparatus.
Figure 28:
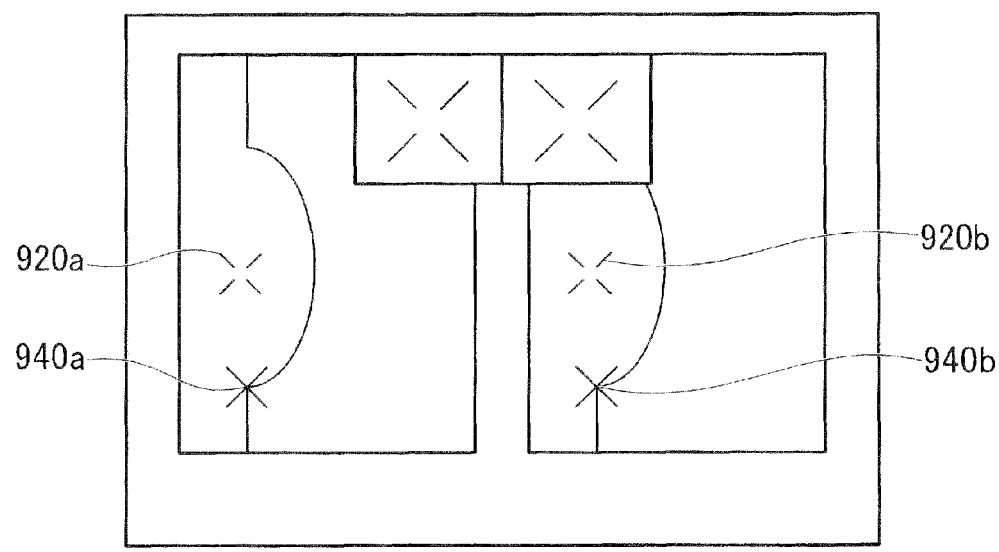
FIG. 28 is a reference view showing the display screen of a conventional endoscope apparatus.

Next, the basic principle of measurement in the present embodiment will be described. FIG. 26 shows the positional relationship of two right and left images on a three-dimensional spatial coordinate system with x, y, and z axes. A state where a point P that is a measurement target of the distance (object distance) from the distal end of the insertion portion to a subject is imaged on a right imaging plane 28R and left imaging plane 28L of the imaging device 28 is shown in FIG. 26. In FIG. 26, points OR and OL are defined as principal points of an optical system, distance f is defined as a focal distance, points QR and QL are defined as the image location of the point P, and distance L is defined as the distance between the point OR and the point OL.

In FIG. 26, Expression (1) is established from a straight line QR-OR.

$$x/xR = \{y - (L/2)\}/\{yR - (L/2)\} = z/(-f) \quad (1)$$

Additionally, Expression (2) is established from a straight line QL-OL.

$$x/xL = \{y + (L/2)\}/\{yL - (L/2)\} = z/(-f) \quad (2)$$

If x, y, and z of this expression are solved, the three-dimensional coordinates of the point P are acquired. Thereby, the distance (object distance) from the point OR or point OL to the subject is obtained. Additionally, as for a plurality of measurement points, a three-dimensional length or a three-dimensional area can be obtained by acquiring the three-dimensional coordinates of the point P, and performing various operations, using the three-dimensional coordinates.

Figure 11:
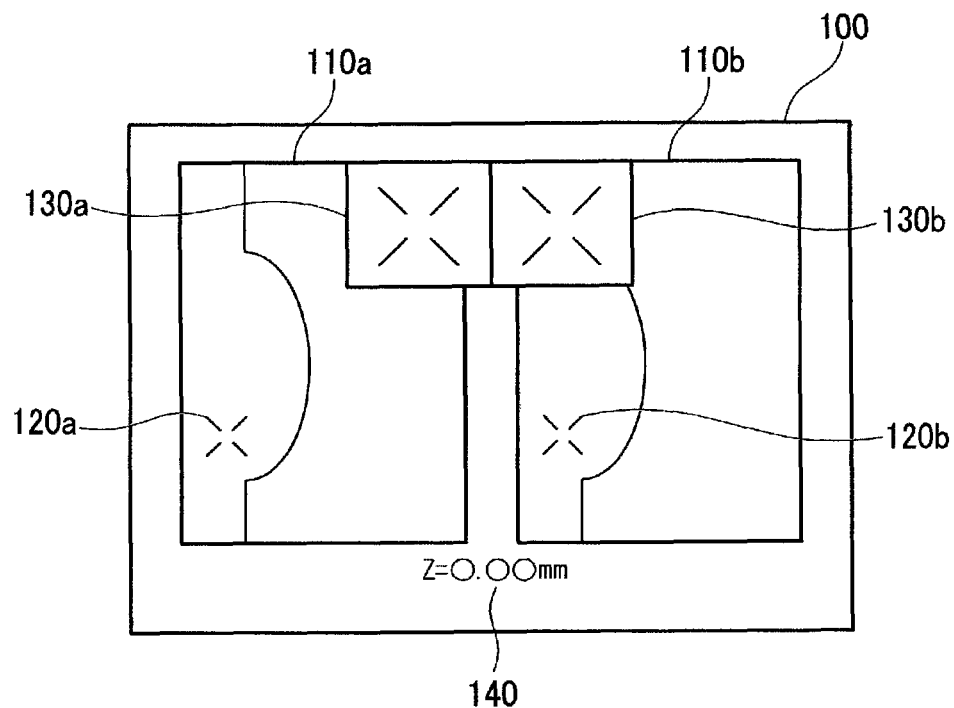

Next, a method of controlling the display position of a zoom window that is the feature of the present embodiment will be described. When the execution of a measuring function is instructed by a user, an s display screen 100 shown in FIG. 11 is displayed. The display of the menu is omitted in the present embodiment. Additionally, although only the measurement between the two points is described as the measuring function, the method which will be described in the present embodiment can also be expanded to other measuring functions.

In the display screen 100, a cursor 120a is displayed on a left image 110a, and a cursor 120b is displayed on a right image 110b. The display position of the cursor 120a is designated by a user. Additionally, a measurement point is set to the display position of the cursor 120a, and the two-dimensional coordinates of a corresponding point on the right image 110b corresponding to the two-dimensional coordinates of the measurement point are calculated by the matching process. The two-dimensional coordinates of the corresponding point become the display position of the cursor 120b. An image obtained by enlarging a region around the cursor 120a is displayed on a zoom window 130a on the left image 110a, and an image obtained by enlarging a region around the cursor 120b is displayed on a zoom window 130b on the right image 110b.

Additionally, the object distance is calculated based on the two-dimensional coordinates of the measurement point indicated by the display position of the cursor 120a, and the two-dimensional coordinates of the corresponding point indicated by the display position of the cursor 120b. A message 140 shows the calculation result of the object distance. When the user moves the cursor 120a, the message 140 is updated in real time.

In the measurement between the two points of the present embodiment, it is possible to calculate the distance between the two points by using two measurement points of a fixed measurement point and an unfixed measurement point. The fixed measurement point is a measurement point where the position on the left image has been fixed when a user input an instruction, which fixes a measurement point, to the endoscope apparatus 1. Additionally, the unfixed measurement point is a measurement point where the position on the left image is not fixed and which is movable according to the movement of a cursor.

Figure 12:
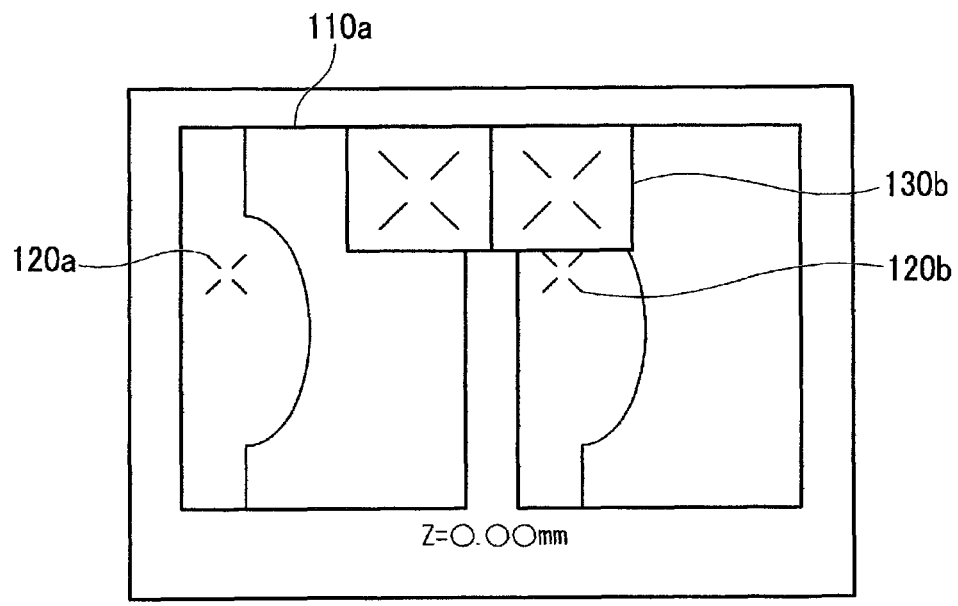
FIG. 12 is a reference view showing the display screen of the endoscope apparatus according to one embodiment of the present invention.

When the user has moved the cursor 120a to the upper part of the left image 110a in order to designate a measurement point at an upper part of the left image 110a, the cursor 120b approaches the zoom window 130b as in FIG. 12. When the user further moves the cursor 120a up as it is, the cursor 120b will overlap the zoom window 130b. In the present embodiment, in this case, control is executed so that the cursor 120b does not overlap the zoom window 130b.

Figure 13:
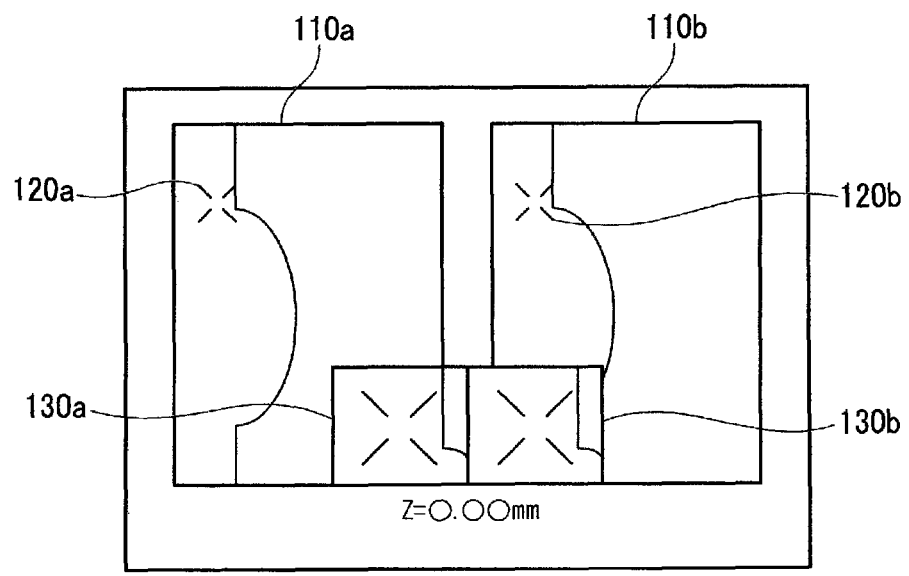
FIG. 13 is a reference view showing the display screen of the endoscope apparatus according to one embodiment of the present invention.

Specifically, as in FIG. 13, the zoom window 130b moves to a lower part of the right image 110b, and the zoom window 130a moves to the lower part of the left image 110a. Thereby, the cursor 120b will not overlap the zoom window 130b. In FIG. 12, since the cursor 120a does not overlap the zoom window 130a, the zoom window 130a is not necessarily moved. However, as the vertical positions of the right and left zoom windows become always the same, it is possible to maintain a state where a user can easily view the right and left windows. For this reason, in the present embodiment, except for special cases, the zoom window 130a is displayed at the same position as the vertical position of the zoom window 130b.

Figure 14:
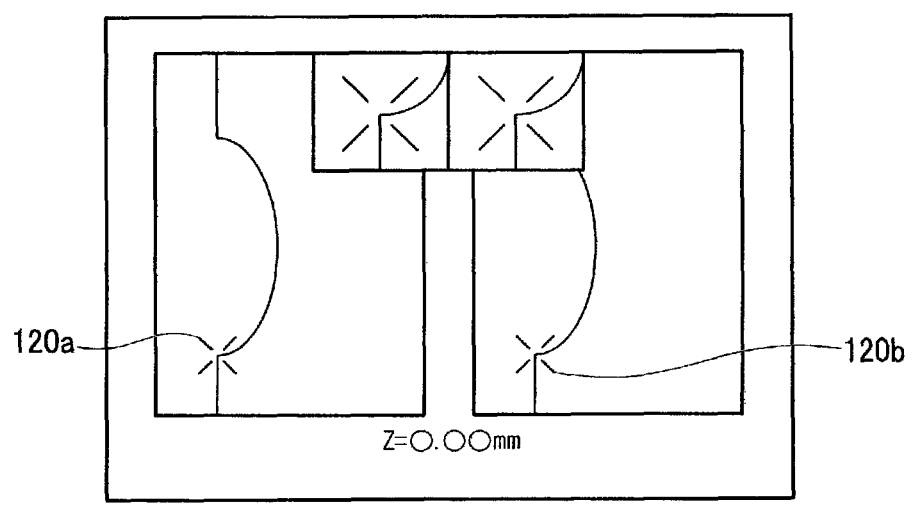
FIG. 14 is a reference view showing the display screen of the endoscope apparatus according to one embodiment of the present invention.

After the state of FIG. 11, as in FIG. 14, the user moves the cursor 120a to a position which is intended to fix a measurement point, and when an instruction which fixes the measurement point is input, the user fixes the measurement point. At this time, as in FIG. 15, a fixed measurement point 150a and its corresponding point 150b are displayed. When the measurement point 150a is fixed, the distance between two points is calculated using the fixed measurement point 150a, and an unfixed measurement point set to the display position of the cursor 120a. The calculation result of the distance between the two points is displayed as the message 141.

Figure 15:
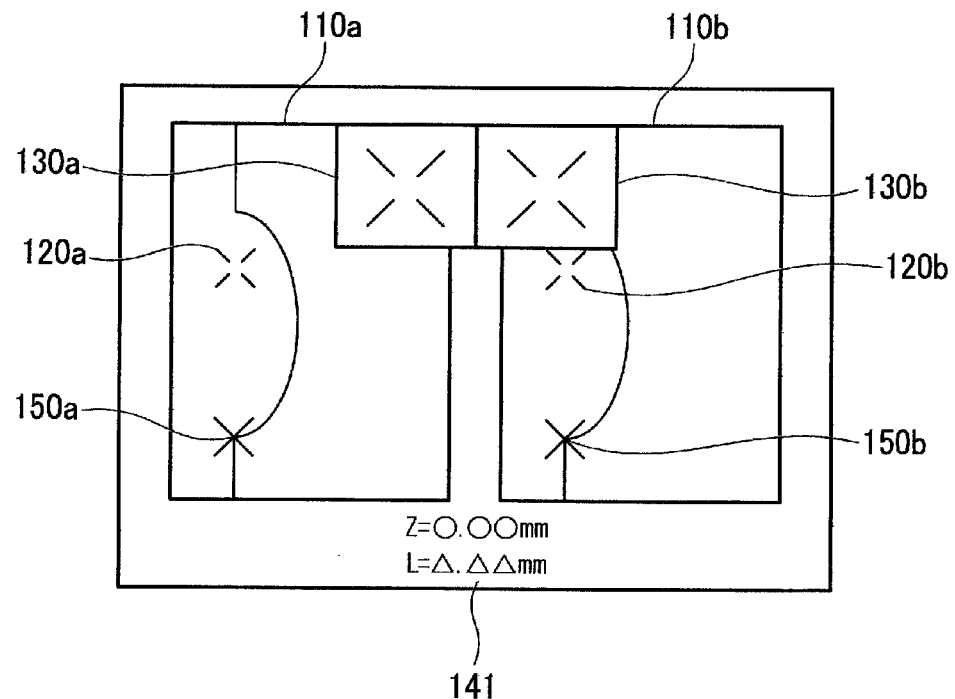
FIG. 15 is a reference view showing the display screen of the endoscope apparatus according to one embodiment of the present invention.

When the user further moves the cursor 120a to the upper part of the left image 110a after the state of FIG. 15, the cursor 120b will overlap the zoom window 130b. For this reason, control is executed so that the cursor 120b does not overlap the zoom window 130b.

In this control, the display position of the zoom window 130b is determined so that not only the cursor 120b but also the corresponding point 150b does not overlap the zoom window 130b.

Figure 16:
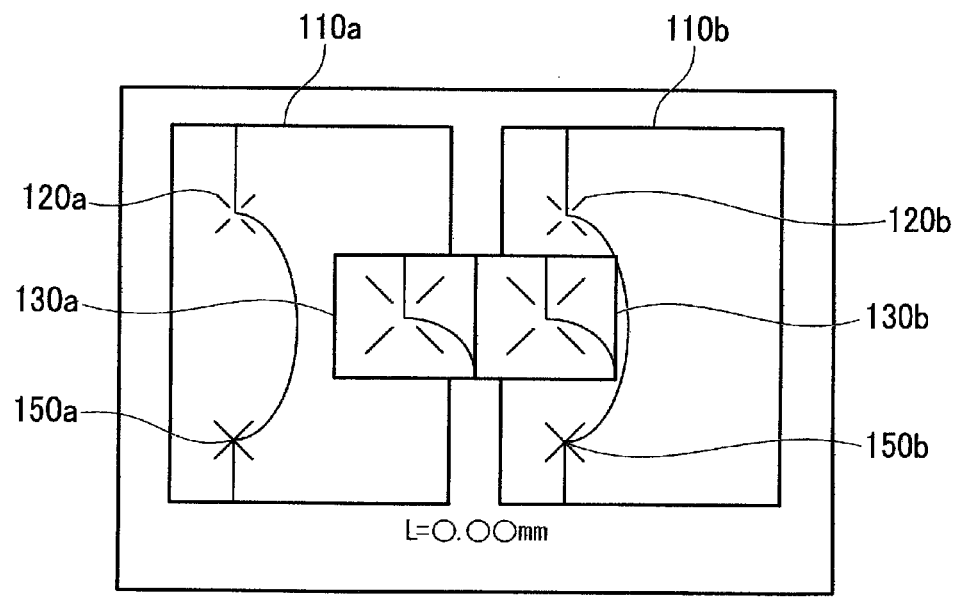
FIG. 16 is a reference view showing the display screen of the endoscope apparatus according to one embodiment of the present invention.

Specifically, as in FIG. 16, the zoom window 130b moves to a central part of the right image 110b, and the zoom window 130a moves to a central part of the left image 110a. Thereby, the cursor 120b will not overlap the zoom window 130b, and the corresponding point 150b will not overlap the zoom window 130b. Additionally, the zoom window 130a also moves in accordance with the movement of the zoom window 130b.

Figure 17:
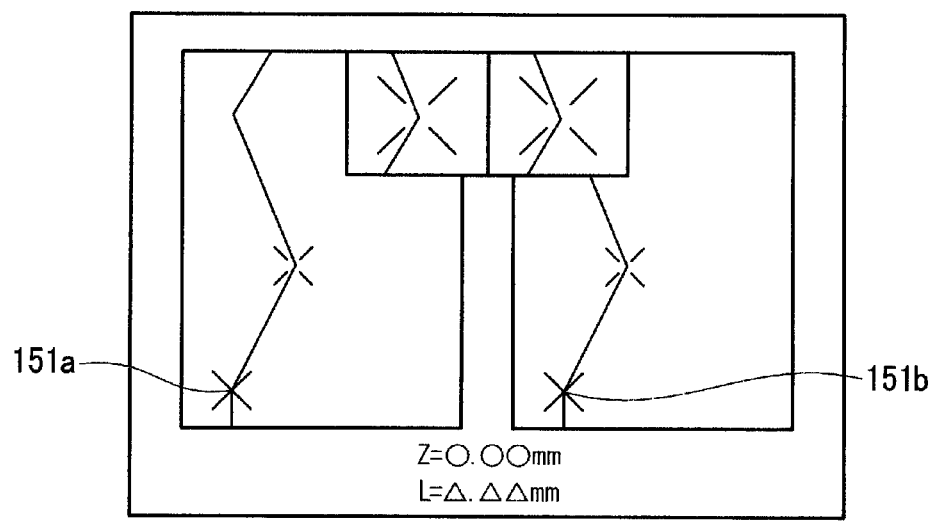
FIG. 17 is a reference view showing the display screen of the endoscope apparatus according to one embodiment of the present invention.

In the measurement between the two points of the present embodiment, it is possible to designate a new first measurement point when a second measurement point is fixed, after a first measurement point (for example, the measurement point 150a) is fixed. For example, as in FIG. 17, a first measurement point 151a is fixed, and the fixed measurement point 151a and its corresponding point 151b are displayed. Subsequently, as in FIG. 18, a second measurement point 152a is fixed and the fixed measurement point 152a and its corresponding point 152b are displayed. After this, it is possible for the user to designate a new first new measurement point by the cursor 120a.

Figure 18:
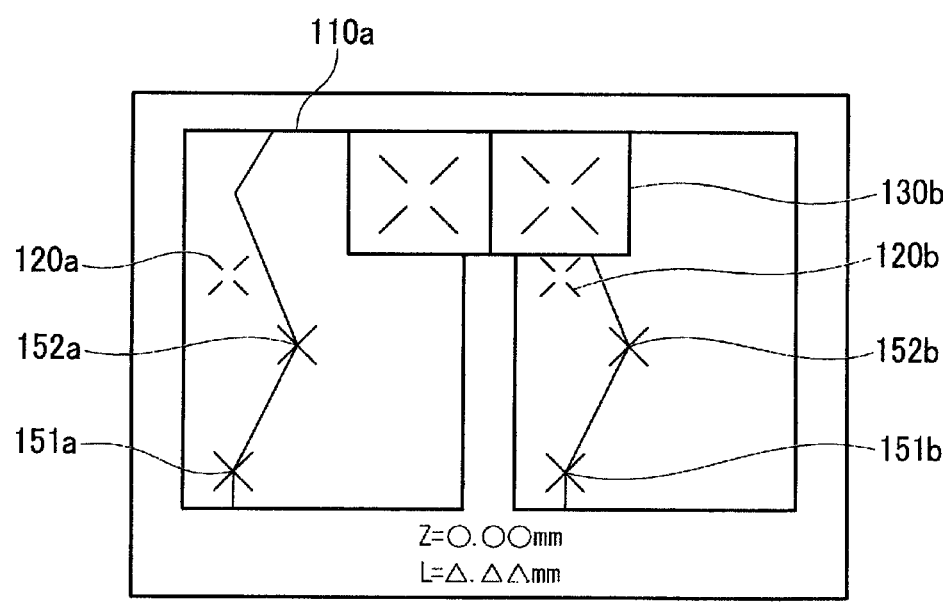
FIG. 18 is a reference view showing the display screen of the endoscope apparatus according to one embodiment of the present invention.

When the user further moves the cursor 120a to the upper part of on the left image 110a after the state of FIG. 18, the cursor 120b will overlap the zoom window 130b. For this reason, control is executed so that the cursor 120b does not overlap the zoom window 130b.

In this control, the display position of the zoom window 130b is determined so that not only the cursor 120b but also the corresponding points 151b and 152b do not overlap the zoom window 130b.

Figure 19:
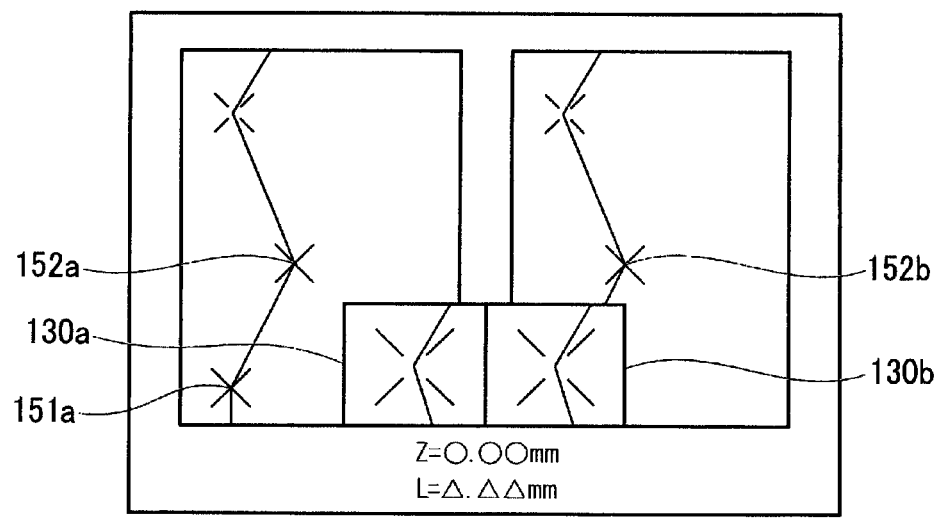
FIG. 19 is a reference view showing the display screen of the endoscope apparatus according to one embodiment of the present invention.

In the present embodiment, the right and left zoom windows are basically displayed at the same vertical position in consideration of ease of comparison by visual observation of images within the right and left zoom windows. Additionally, the horizontal position of each zoom window does not change, and only the vertical position changes. When the user further moves the cursor 120a to the upper part of the left image 110a after the state of FIG. 18, even if the zoom window 130b moves to any place in a vertical direction, the zoom window will overlap at least any one of the cursor 120b, and the corresponding points 151b and 152b. In this case, as in FIG. 19, the zoom window 130b moves to a position which overlaps the oldest corresponding point 151b (which is first set). Additionally, the zoom window 130a also moves in accordance with the movement of the zoom window 130b.

Figure 4:
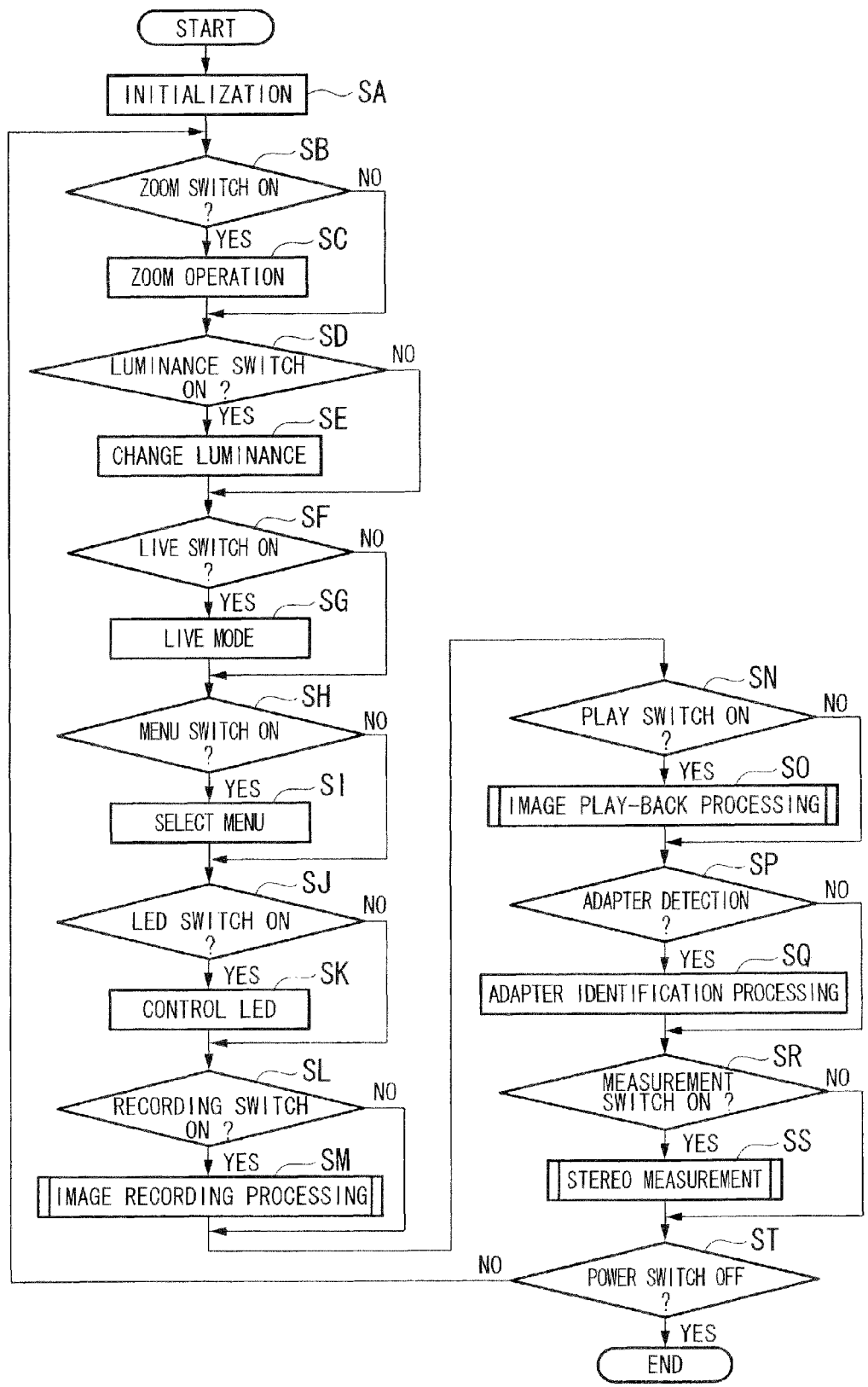
FIG. 4 is a flow chart showing the procedure of operation of the endoscope apparatus according to one embodiment of the present invention.

Next, the operation of the endoscope apparatus 1 will be described, with reference to flow charts. FIG. 4 shows the overall operation of the endoscope apparatus 1. When the endoscope apparatus 1 is started, the control unit 46 executes initialization (Step SA). Subsequently, the control unit 46 monitors a signal input from the operation portion 6 via the RS232C I/F 17, and determines whether or not a zoom switch for change of the magnification of an image is set to ON (Step SB). If the zoom switch is set to ON, the control unit 46 instructs the video signal processing circuit 12 of a magnification change in the electronic zoom processing for enlarging the image (Step SC). Thereafter, the processing proceeds to Step SD. Additionally, if the zoom switch is set to OFF in Step SB, the processing proceeds to Step SD.

Subsequently, the control unit 46 monitors a signal input from the operation portion 6 via the RS232C I/F 17, and determines whether or not a luminance switch for changing the luminance of an image is set to ON (Step SD). If the luminance switch is set to ON, the control unit 46 instructs the video signal processing circuit 12 of a change in the luminance of the whole image (Step SE). Thereafter, the processing proceeds to Step SF. Additionally, if the luminance switch is set to OFF in Step SD, the processing proceeds to Step SF.

Subsequently, the control unit 46 monitors a signal input from the operation portion 6 via the RS232C I/F 17, and determines whether or not a live switch for changing a measurement mode to a live mode is set to ON (Step SF). The endoscope apparatus 1 is able to operate in a plurality of operation modes (a live mode, a recording mode, a measurement mode, a play mode). The live mode is a mode where a live streaming video image picked up by the endoscope 2 is displayed in real time. The recording mode is a mode where the data of a still image picked up by the endoscope 2 is recorded on the memory card 32.

The measurement mode is a mode where the measurement between the two points is executed based on the data of the still image picked up by the endoscope 2. The play mode is a mode where the image data recorded on the memory card 32 is read to display an image. If any of the recording mode, measurement mode, or play mode is operated, and the live switch is set to ON, the control unit 46 changes the operation mode to the live mode, and instructs each unit within the endoscope apparatus 1 of the operation in the live mode. Thereby, the imaging device 28 images a subject and creates image signals. The CCU 9 converts the image signals into video signals. The video signal processing circuit 12 synthesizes the video signals with the graphic image signals from the image creating unit 45, creates display signals, and outputs the display signals to the monitor 4. The monitor 4 displays an image based on the display signals (Step SG).

Thereafter, the processing proceeds to Step SH. Additionally, if the live switch is set to OFF in Step SF, the processing proceeds to Step SH.

Subsequently, the control unit 46 monitors a signal input from the operation portion 6 via the RS232C I/F 17, and determines whether or not the menu switch is set to ON (Step SH).

If the menu switch is set to ON, the image creating unit 45 creates graphic image signals for display of an operation menu, and outputs the graphic image signals to the video signal processing circuit 12 (Step SI). Thereafter, the processing proceeds to Step SJ. Additionally, if the menu switch is set to OFF in Step SH, the processing proceeds to Step SJ.

Subsequently, the control unit 46 monitors a signal input from the operation portion 6 via the RS232C I/F 17, and determines whether or not an LED switch which turns on/off an LED within the optical adapter is set to ON (Step SJ). If the LED switch is set to ON, the control unit 46 instructs the endoscope unit 8 of the starting of an illuminating device (Step SK). Thereafter, the processing proceeds to Step SL. Additionally, if the LED switch is set to OFF in Step SJ, the processing proceeds to Step SL.

Subsequently, the control unit 46 monitors a signal input from the operation portion 6 via the RS232C I/F 17, and determines whether or not a recording switch for recording an image is set to ON (Step SL). If the recording switch is set to ON, the control unit 46 changes the operation mode to the recording mode, and records the image data imported from the video signal processing circuit 12 on the memory card 32 via the card I/F 15 (Step SM). The details of Step SM will be described later.

Thereafter, the processing proceeds to Step SN. Additionally, if the recording switch is set to OFF in Step SL, the processing proceeds to Step SN.

Subsequently, the control unit 46 monitors a signal input from the operation portion 6 via the RS232C I/F 17, and determines whether or not a play switch for playing back an image is set to ON (Step SN). If the play switch is set to ON, the control unit 46 changes the operation mode to the play mode, reads the image data from the memory card 32 via the card I/F 15, and outputs the image data to the video signal processing circuit 12 (Step SO). The details of Step SO will be described later. Thereafter, the processing proceeds to Step SP. Additionally, if the play switch is set to OFF in Step SN, the processing proceeds to Step SP.

Subsequently, the control unit 46 monitors a signal input from a signal line (not shown) to be connected to the distal end 21 of the insertion portion 20, and determines whether or not the optical adapter is mounted (Step SP).

If the optical adapter is mounted, the control unit 46 identifies the kind of optical adapter, reads environmental data corresponding to the kind of optical adapter via the card I/F 15 from the memory card 32, and stores the environmental data in the RAM 14 (Step SQ). The identification of the kind of optical adapter is performed, for example, by detecting different resistance according to the kind of the optical adapter provided within the optical adapter. Thereafter, the processing proceeds to Step SR. Additionally, if the optical adapter is not mounted in Step SP, the processing proceeds to Step SR.

Subsequently, the control unit 46 monitors a signal input from the operation portion 6 via the RS232C I/F 17, and determines whether or not a measurement switch for stereo measurement is set to ON (Step SR). If the measurement switch is set to ON, the control unit 46 changes the operation mode to the measurement mode, and makes each functional unit of the CPU 18 execute stereo measurement (Step SS).

The details of Step SS will be described later. Thereafter, the processing proceeds to Step ST. Additionally, if the measurement switch is set to OFF in Step SR, the processing proceeds to Step ST.

Subsequently, the control unit 46 monitors a signal input from the operation portion 6 via the RS232C I/F 17, and determines whether or not a power switch for a power source is set to OFF (Step ST). If the power switch is set to OFF, the endoscope apparatus 1 ends the operation. Additionally, if the power switch is set to ON in Step ST, the processing returns to Step SB.

Next, the details of the above Step SS (the stereo measurement) will be described. Hereinafter, the measurement between the two points is taken as an example. The user operates a joystick provided in the operation portion 6, and designates a measurement point while observing a measurement screen displayed on the monitor 4. A cursor used as a mark which shows the measurement point is displayed on an image, and the cursor moves in a direction in which the joystick is down. When the user performs the operation of pushing in the joystick at a desired position, and an instruction which fixes the measurement point is input, the measurement point is fixed at the position of the cursor at that time.

In the general measurement between the two points, measurement is not executed unless both measurement points are fixed. However, in the measurement between the two points in the present embodiment, measurement is executed even in a state where a first measurement point is fixed and a second measurement point is not fixed, and a measurement result is displayed. Additionally, since the measurement is repeatedly executed, if a cursor is moved by the operation of the joystick, the measurement result is updated in real time according to the movement of the cursor. Since measurement is performed even if the user does not perform the operation of fixing the second measurement point, the operation burden on the user can be mitigated.

Figure 5:
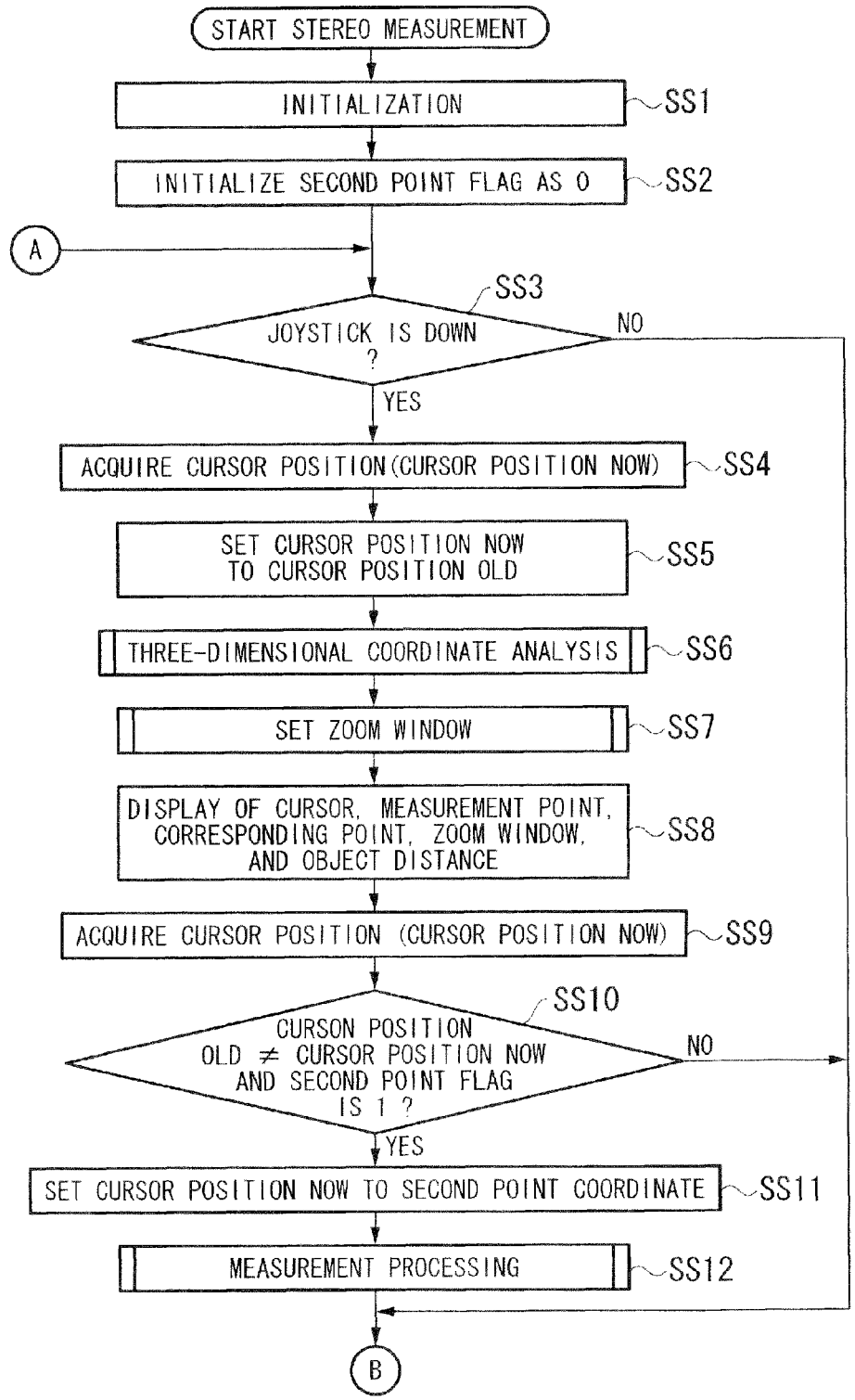
FIG. 5 is a flow chart showing the procedure of operation of the endoscope apparatus according to one embodiment of the present invention.
Figure 6:
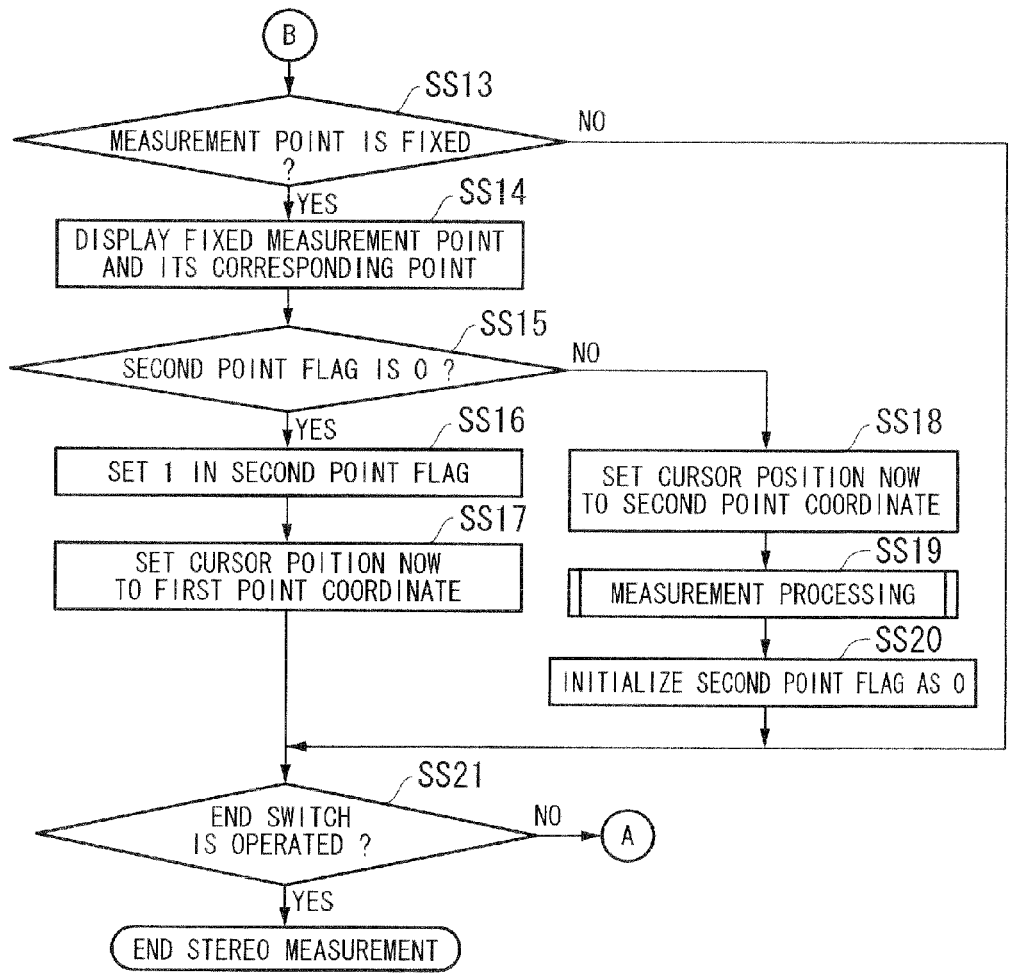
FIG. 6 is a flow chart showing the procedure of operation of the endoscope apparatus according to one embodiment of the present invention.

The concrete procedure of the stereo measurement will be described below. FIGS. 5 and 6 show the procedure of the stereo measurement. First, the control unit 46 executes initialization processing. In this initialization processing, a cursor position NOW and a cursor position OLD which are stored in the RAM 14 and which represent the display position of a cursor are initialized (Step SS1). The cursor position NOW represents the display position of the cursor which is finally acquired. Additionally, the cursor position OLD represents the display position of the cursor which was acquired one time before the last.

Subsequently, the control unit 46 sets 0 in a second point flag stored in the RAM 14 (Step SS2). The second point flag fixes a first measurement point, and shows whether or not the input of the second measurement point has been performed. If 0 is set in the second point flag, the first measurement point is not fixed. Additionally, if 1 is set in the second point flag, the first measurement point is fixed, and the input of the second measurement point can be performed.

Subsequently, the control unit 46 monitors a signal input from the operation portion 6 via the RS232C I/F 17, and determines whether or not the joystick for inputting a measurement point is down (Step SS3). In Step SS3, if the joystick is down, the processing proceeds to Step SS4. Additionally, if the joystick is not down, the processing proceeds to Step SS13.

If the processing has proceeded to Step SS4, the measurement point setting unit 41 acquires a cursor position on an image by the same monitoring of the joystick as the above. Specifically, the measurement point setting unit 41 reads the cursor position OLD from the RAM 14, and, adopts the information obtained by adding the amount of change in the cursor position by the operation of the joystick to the cursor position OLD as the cursor position on the image. The information on the cursor position acquired by the measurement point setting unit 41 is stored in the RAM 14 as the cursor position NOW (Step SS4).

Subsequently, the measurement point setting unit 41 stores in the RAM 14 the information on a cursor position stored as the cursor position NOW in the RAM 14, as the cursor position OLD (Step SS5). At this time, the cursor position NOW and the cursor position OLD are the same. Subsequently, the three-dimensional coordinate analysis of calculating the three-dimensional coordinates of the cursor position NOW is executed (Step SS6). The details of Step SS6 will be described later. Subsequently, the setting for displaying a zoom window is performed (Step SS7). The details of Step SS7 will be described later.

Subsequently, the image creating unit 45 creates graphic image signals for displaying a cursor, a measurement point, a corresponding point, a zoom window, and object distance, and outputs the graphic image signals to the video signal processing circuit 12 along with the information on the display position of the cursor or the like. The video signal processing circuit 12 synthesizes the graphic image signals with the video signals from the CCU 9, and creates display signals. At this time, the video signal processing circuit 12 synthesizes the graphic image signals with the video signals to create the display signals so that the cursor or the like is displayed on the display position notified from the image creating unit 45, and outputs the display signals to the monitor 4. The monitor 4 displays an image based on the display signals. Thereby, the cursor or the like is displayed along with the image of a subject picked up by the endoscope 2 (Step SS8).

The position indicated by the cursor becomes the position of a measurement point. The user is able to move the cursor freely by the operation of a joystick in a state before the measurement point is fixed. Additionally, as described with reference to FIG. 26, the object distance is obtained based on a Z coordinate among the three-dimensional coordinates calculated in Step SS8.

Subsequently, the measurement point setting unit 41 acquires a cursor position on an image again similarly to Step SS4, and updates the cursor position NOW within the RAM 14 by the information on the acquired cursor position (Step SS9). Subsequently, the control unit 46 reads the cursor position NOW, the cursor position OLD, and the second point flag from the RAM 14, and determines whether or not the cursor position NOW and the cursor position OLD are different from each other, and the value of the second point flag is 1 (Step SS10).

If the cursor position NOW and the cursor position OLD are different from each other, and the value of the second point flag is 1, the processing proceeds to Step SS11. That is, if the cursor does not move among Steps SS4 to SS9 and the first measurement point is fixed, the processing proceeds to Step SS11. Additionally, if the cursor position NOW and the cursor position OLD are the same, and the value of the second point flag is 0, the processing proceeds to Step SS13. That is, if the cursor moves among Steps SS4 to SS9, or if the first measurement point is not fixed, the processing proceeds to Step SS13.

If the processing proceeds to Step SS11, the measurement point setting unit 41 stores the cursor position NOW in the RAM 14 as second point coordinates showing the coordinates of a second measurement point on a left image (Step SS11). Subsequently, the measurement processing of performing the measurement between the two points based on the coordinates of the first and second measurement points is executed (Step SS12). The details of Step SS12 will be described later.

Subsequently, the control unit 46 determines whether or not the joystick is pushed in to fix a measurement point (Step SS13). If the joystick is pushed in, the processing proceeds to Step SS14. Additionally, if the joystick is not pushed in, the processing proceeds to Step SS21.

If the processing proceeds to Step SS14, the image creating unit 45 displays the fixed measurement point at the display position of the cursor on the left image. Then, graphic image signals for displaying a corresponding point of the measurement point on a right image are created, and are output to the video signal processing circuit 12 along with the information on the display position of the cursor or the like. The video signal processing circuit 12 synthesizes the graphic image signals with the video signals from the CCU 9, and creates display signals. The monitor 4 displays the fixed measurement point and a point corresponding thereto along with the image of a subject, a cursor, a zoom window, etc., and based on the display signals (Step SS14). After this, the image creating unit 45 creates graphic image signals for the fixed measurement point so that an icon of the measurement point is displayed on the same position in order to fix the fixed measurement point on an image. Additionally, the coordinates of the fixed measurement point and the point corresponding thereto are stored in the RAM 14 in the order of fixation.

Subsequently, the control unit 46 reads the second point flag from the RAM 14, and determines whether or not the value of the second point flag is 0 (Step SS15). If the value of the second point flag is 0 (if the first measurement point is not fixed), the processing proceeds to Step SS16. If the second point flag is 1 (if the first measurement point is fixed), the processing proceeds to Step SS18.

If the processing proceeds to Step SS16, the first measurement point is fixed. The control unit 46 sets 1 in the second point flag stored in the RAM 14 (Step SS16). Subsequently, the measurement point setting unit 41 stores in the RAM 14 the information on the cursor position stored as the cursor position NOW in the RAM 14 as a first point coordinates showing the coordinates of the first measurement point on the left image (Step SS17). Subsequently, the processing proceeds to Step SS21.

On the other hand, if the processing proceeds to Step SS18, the second measurement point is fixed. The measurement point setting unit 41 stores in the RAM 14 the information on a cursor position stored as the cursor position NOW in the RAM 14, as the second point coordinates (Step SS18). Subsequently, the measurement processing of performing the measurement between the two points based on the coordinates of the first and second measurement points is executed (Step SS19). The details of Step SS19 will be described later.

Subsequently, the control unit 46 sets 0 in the second point flag stored in the RAM 14 (Step SS20). Subsequently, the processing proceeds to Step SS21.

If the processing proceeds to Step SS21, the control unit 46 determines whether or not an end switch has been operated (Step SS21). If the end switch has not been operated, the processing returns to Step SS3. Additionally, if the end switch has been operated, the stereo measurement ends.

The above processing is simply summarized as follows. In the measurement between the two points, first, the input of the first measurement point is performed. In that case, the three-dimensional coordinates of a cursor position are calculated by the processing of Step SS6, and the object distance is displayed in Step SS8. When a user performs the operation of pushing in a joystick, the first measurement point is fixed. When the first measurement point is fixed, the input of the second measurement point is subsequently performed. Even in the case of the input of the second measurement point, the three-dimensional coordinates of the cursor position are calculated by the processing of Step SS6, and the object distance is displayed in Step SS8. Additionally, the measurement processing is executed in Step SS12, and the distance between the two points is displayed as a measurement result. When the second measurement point is fixed, it is possible to input the first measurement point again. That is, it is possible to repeat the above processing, thereby repeatedly performing the measurement of the distance between the two points.

Figure 7:
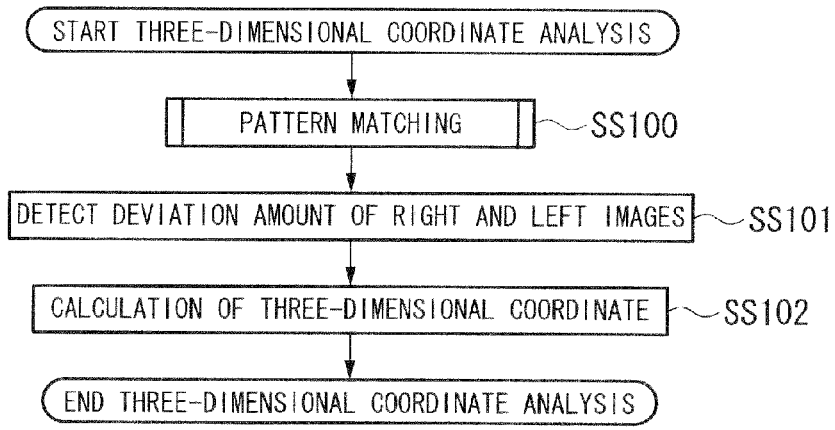
FIG. 7 is a flow chart showing the procedure of operation of the endoscope apparatus according to one embodiment of the present invention.

Next, the details of Step SS6 (three-dimensional coordinate analysis) will be described, referring to FIG. 7. First, the corresponding-point setting unit 42 executes the pattern matching processing, and detects matching points that are corresponding points of two right and left images (stereo images) (Step SS100). The details of the pattern matching processing are described later. Subsequently, the arithmetic processing unit 44 calculates the deviation amount of the two right and left images from the coordinates of the corresponding points (Step SS101). Subsequently, the arithmetic processing unit 44 calculates the three-dimensional coordinates of target points (Step SS102).

Figure 8:
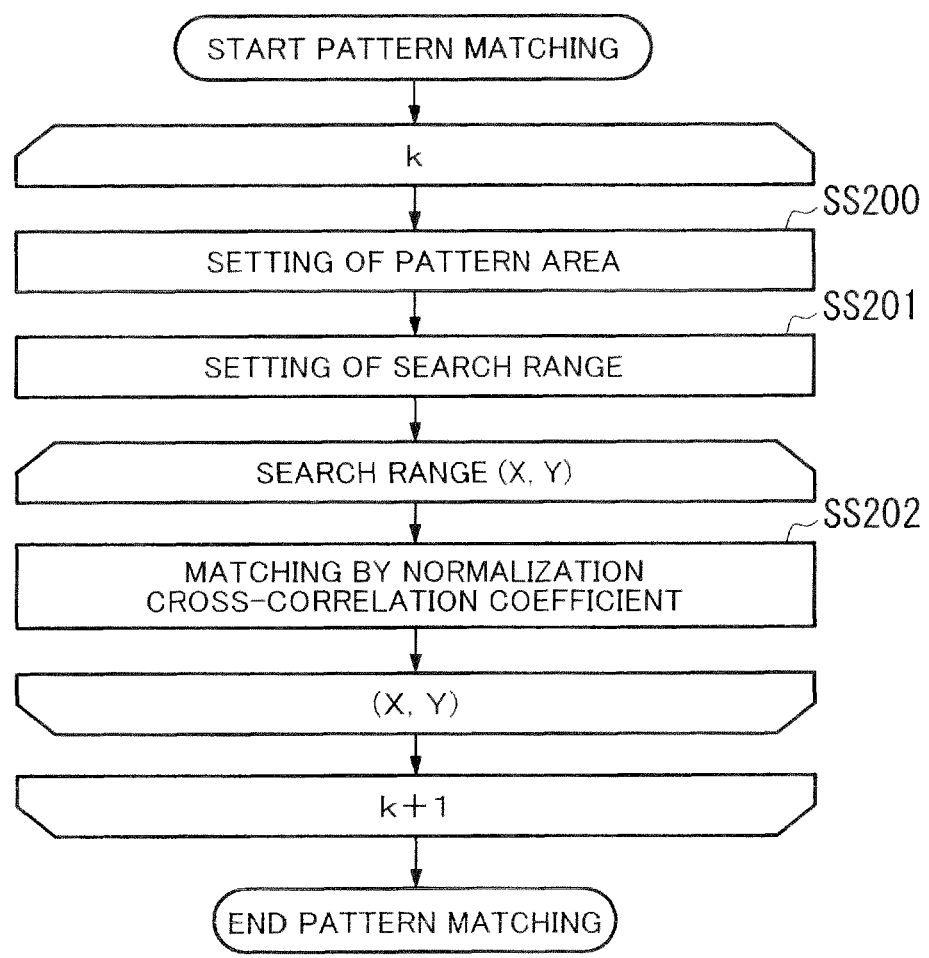
FIG. 8 is a flow chart showing the procedure of operation of the endoscope apparatus according to one embodiment of the present invention.

Next, the details of Step SS100 (the pattern matching processing) will be described, referring to FIG. 8. First, the corresponding-point setting unit 42 sets a pattern area that is a region where pattern matching is performed (Step SS200). In the example of the present embodiment, the corresponding-point setting unit 42 sets the pattern area of a size corresponding to a value k to a position having the cursor position NOW as a center. The pattern area corresponding to the value k is as follows.

The pattern area is 35×35 (pixels) in case of k=1.
The pattern area is 23×23 (pixels) in case of k=2.
The pattern area is 11×11 (pixels) in case of k=3.

The corresponding-point setting unit 42 switches the value k from a small one to a large one, narrows down the region from a large one to a small one, and raises the precision of the corresponding-point detection.

Subsequently, the corresponding-point setting unit 42 determines the region of the right image where a pattern is to be searched, and sets a search range (Step SS201). As the setting methods of the search range, there is a method of setting the search range to less than ±5 pixels of an epipolar line in consideration of an error, a method of setting the search range to less than ±7 pixels horizontally on a monitor screen, and a method of setting the search range to less than ±10 pixels with a substantially corresponding point manually instructed on a screen as a center. In addition, the above ±10 pixels is an optimal value in which errors caused by manual operation are taken into consideration.

Subsequently, the corresponding-point setting unit 42 performs the pattern matching in the set search range (Step SS202). In this pattern matching, the detection of a corresponding point by normalized cross-correlation is performed, and coordinates (X, Y) with the largest normalized cross-correlation coefficient (−1 to +1) become the corresponding point.

The pattern matching is repeatedly performed while the value k is incremented, the pattern is narrowed down in correspondence with the value k, and the pattern area is moved within a search range. The coordinates of the corresponding point are stored in the RAM 14.

Generally, the following Expression is used for a normalized cross-correlation function $M(u, v)$ to be utilized for the pattern matching. That is, when $t(x, y)$ is defined as a template, $g(x, y)$ is defined as image data, $t'$ is defined as the average luminance of the template, and $g'$ is defined as the average luminance of an image, the following Expression (3) is applied. Here, $\Sigma\Sigma_s$ means taking the sum of the pixels.

$$M(u,v) = \{\Sigma\Sigma_s(g(x+u,y+v)-g')(t(x,y)-t')\}/\{\Sigma\Sigma_s(g(x+u,y+v)-g')^2 \times \Sigma\Sigma_s(t(x,y)-t')^2\}^{1/2} \quad (3)$$

When the above pattern matching ends, the pattern matching processing ends.

Figure 9:
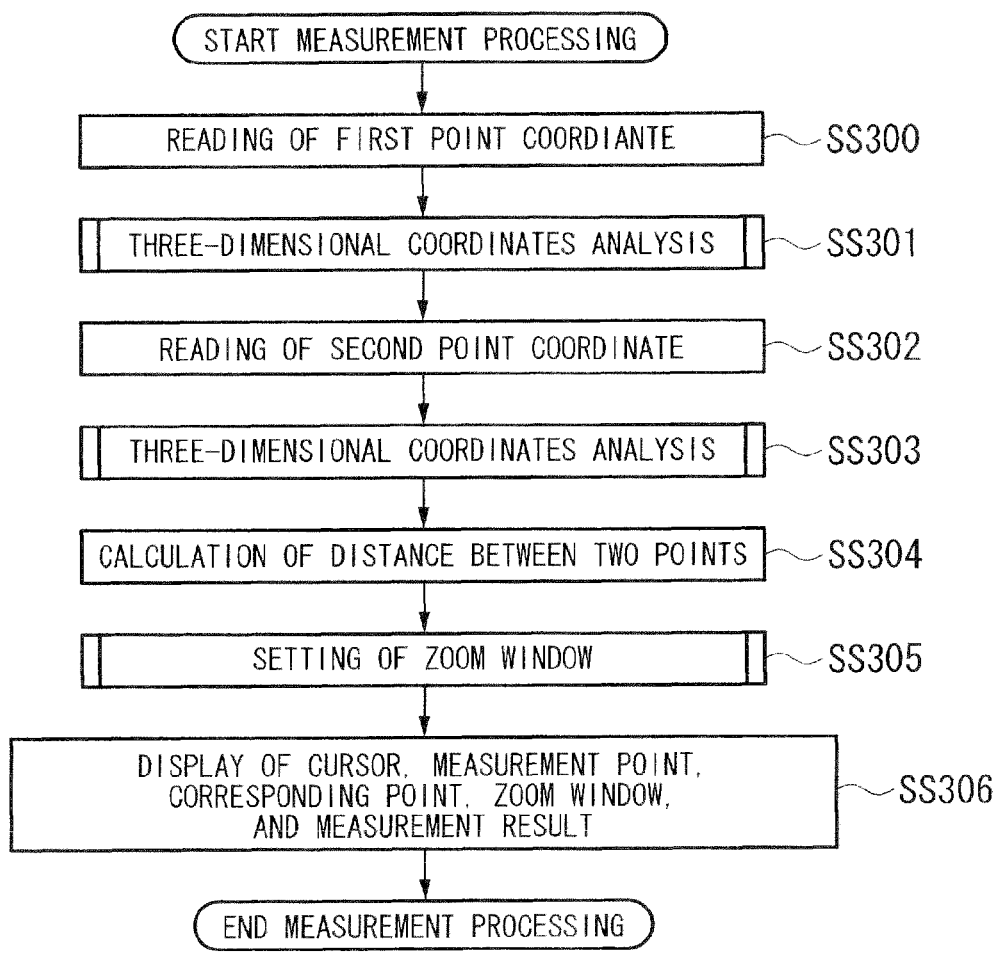
FIG. 9 is a flow chart showing the procedure of operation of the endoscope apparatus according to one embodiment of the present invention.

Next, the details of Step SS12 and Step SS19 (the measurement processing) will be described, referring to FIG. 9. First, the arithmetic processing unit 44 reads first point coordinates corresponding to the first measurement point from the RAM 14 (Step SS300), and executes the three-dimensional coordinate analysis which uses the first point coordinates as an input value (Step SS301). The detailed procedure of Step SS301 is as shown in FIG. 7.

Subsequently, the arithmetic processing unit 44 reads second point coordinates corresponding to the second measurement point from the RAM 14 (Step SS302), and executes the three-dimensional coordinate analysis which uses the second point coordinates as an input value (Step SS303). The detailed procedure of Step SS303 is as shown in FIG. 7.

If the three-dimensional coordinates of the first and second measurement points are obtained, the arithmetic processing unit 44 calculates the distance between the two points of the two measurement points (Step SS304). Subsequently, the setting for displaying a zoom window is performed (Step SS305). The details of Step SS305 will be described later.

Subsequently, the image creating unit 45 creates graphic image signals for displaying a cursor, a measurement point, a corresponding point, a zoom window, and a measurement result, and outputs the graphic image signals to the video signal processing circuit 12 along with the information on the display position of the cursor or the like. The video signal processing circuit 12 synthesizes the graphic image signals with the video signals from the CCU 9, and creates display signals. At this time, the video signal processing circuit 12 synthesizes the graphic image signals with the video signals to create the display signals so that the cursor or the like is displayed on the display position notified from the image creating unit 45, and outputs the display signals to the monitor 4. The monitor 4 displays an image based on the display signals. Thereby, the cursor or the like is displayed along with the image of a subject picked up by the endoscope 2 (Step SS306). Thereby, the measurement processing ends.

Figure 10:
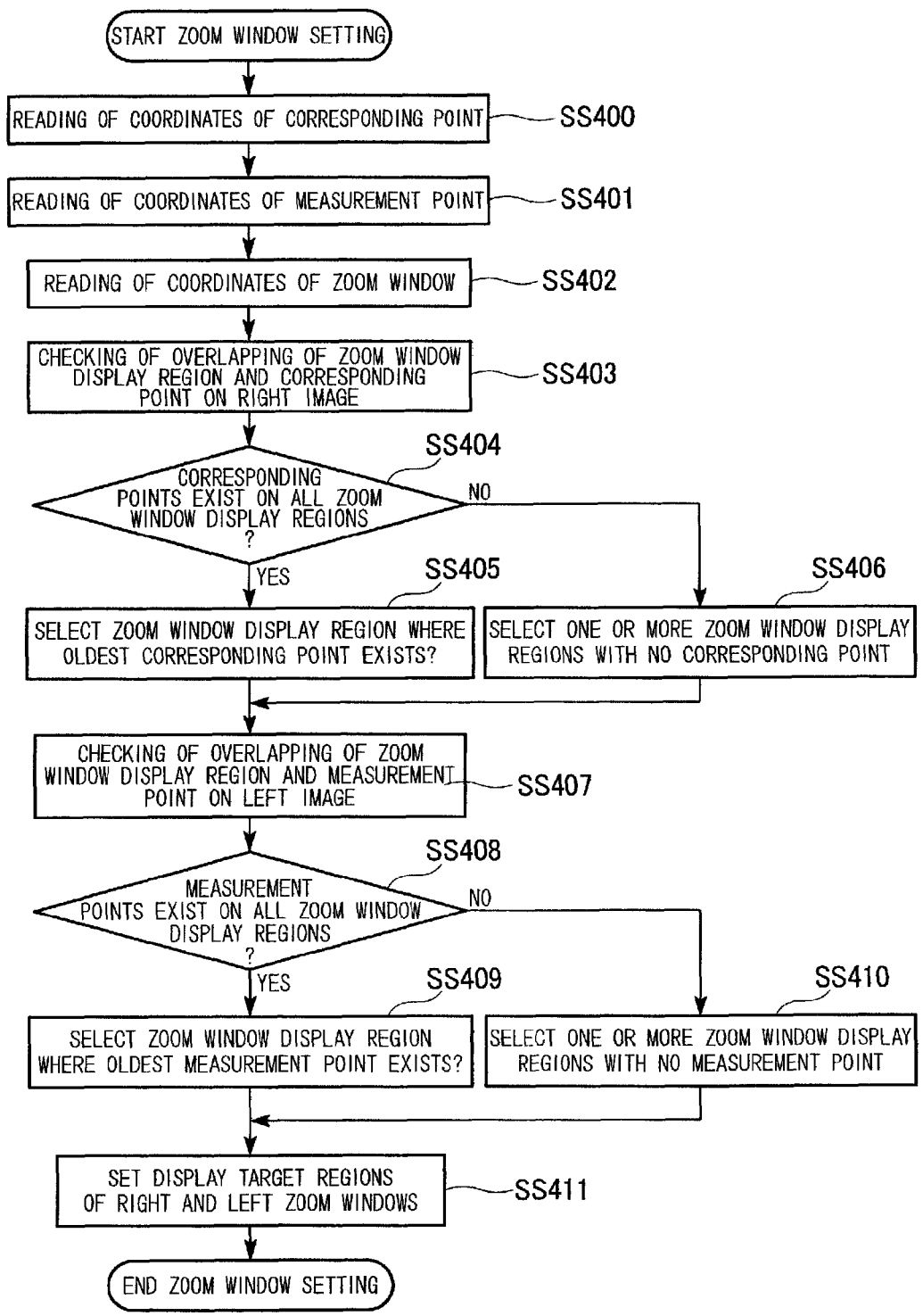
FIG. 10 is a flow chart showing the procedure of operation of the endoscope apparatus according to one embodiment of FIG. 11 is a reference view showing a display screen of the endoscope apparatus according to one embodiment of the present invention.

Next, the details of Step SS7 and Step SS305 (the zoom window setting) will be described, referring to FIG. 10. First, the window setting unit 43 reads from the RAM 14 the coordinates of a corresponding point (that is, a corresponding point corresponding to an unfixed measurement point) calculated in the last three-dimensional coordinate analysis (Steps SS6 and SS303), and the coordinates of a corresponding point corresponding to a fixed measurement point (Step SS400). If there is no fixed measurement point, only the coordinates of the corresponding point calculated in the last three-dimensional coordinate analysis are read. Subsequently, the window setting unit 43 reads the cursor position NOW and the coordinates of the fixed measurement point from the RAM 14 (Step SS401). If there are no coordinates for the fixed measurement point, only the cursor position NOW is read.

Subsequently, the window setting unit 43 reads the coordinates of a current zoom window from the RAM 14 (Step SS402). Subsequently, the window setting unit 43 checks whether or not a region (zoom window display region) where a zoom window is displayed and the corresponding points overlap each other on the right image, for every zoom window display region (Step SS403).

Figure 20:
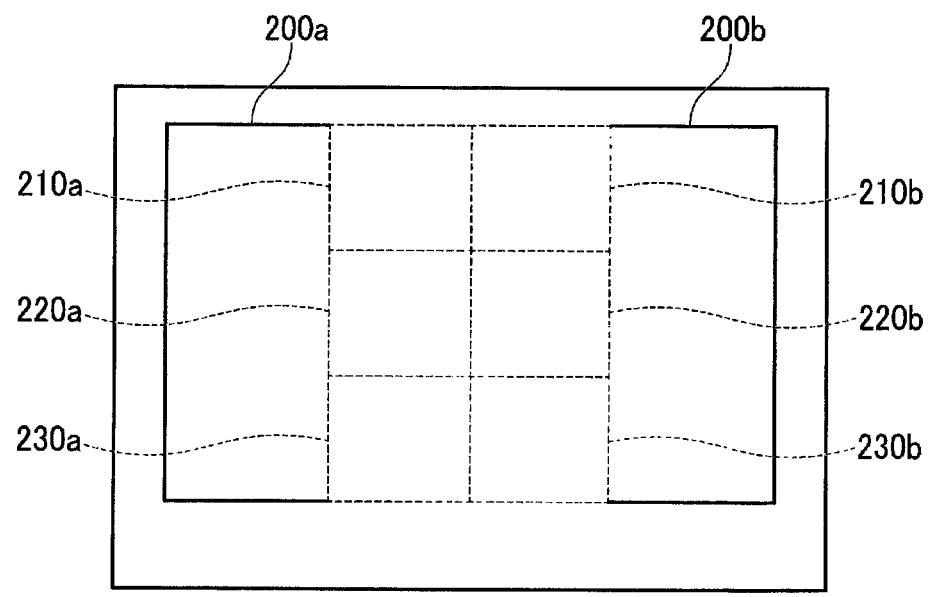
FIG. 20 is a reference view showing a zoom window display region in one embodiment of the present invention.

The zoom window display region will be described below, referring to FIG. 20. A zoom window corresponding to a cursor on the left image 200a is displayed on any of the zoom window display regions 210a, 220a, and 230a. Additionally, a zoom window corresponding to a cursor on the right image 200b is displayed on any of the zoom window display regions 210b, 220b, and 230b.

The window setting unit 43 selects a zoom window display region according to the existence/non-existence of a measurement point and a corresponding point on these zoom window display regions, and sets the zoom window display region to a display target region of a zoom window. A zoom window is displayed on the display target region set by the window setting unit 43. The window setting unit 43 determines whether or not a corresponding point exists on all zoom window display regions on the right image based on a result after the checking in Step SS403 is made, subsequent to Step SS403 (Step SS404).

If a corresponding point exists on all the zoom window display regions on the right image, the window setting unit 43 selects the zoom window display region with the oldest corresponding point (a corresponding point which is first set) (Step SS405). Subsequently, the processing proceeds to Step SS407.

On the other hand, if there is a zoom window display region where no corresponding point exists among the zoom window display regions on the right image, the window setting unit 43 selects one or more zoom window display regions where no corresponding point exists (Step SS406). Subsequently, the processing proceeds to Step SS407.

If the processing proceeds to Step SS407, the window setting unit 43 checks for every zoom window display region whether or not zoom window display regions (zoom window display regions 210a, 220a, and 230a of FIG. 20) on the left image (Step SS407) overlap measurement points. Subsequently, the window setting unit 43 determines whether or not measurement points exist on all the zoom window display regions on the left image based on results after the checking in Step SS407 is made (Step SS408).

If measurement points exist on all the zoom window display regions on the left image, the window setting unit 43 selects a zoom window display region with the oldest measurement point (a measurement point which is first set) (Step SS409). Subsequently, the processing proceeds to Step SS411.

On the other hand, if there is a zoom window display region where no measurement point exists among the zoom window display regions on the left image, the window setting unit 43 selects one or more zoom window display regions where no measurement point exists (Step SS410). Subsequently, the processing proceeds to Step SS411.

If the processing proceeds to Step SS411, the window setting unit 43 sets any of the zoom window display regions on the right image selected in Step SS405 or SS406 to a right display target region. Further, the window setting unit 43 sets any of the zoom window display regions on the left image selected in Step SS409 or SS410 as a left display target region (Step S411).

The details of Step SS411 will be described below. In Step SS411, the window setting unit 43 sets display target regions on the preferential conditions that measurement points or corresponding points do not overlap zoom windows, and the vertical positions of the right and left display target regions become the same.

(1) If zoom window display regions are selected in Steps SS405 and SS409, the window setting unit 43 sets a zoom window display region on the right image selected in Step SS405 to a right display target region. Further, the window setting unit 43 sets a zoom window display region on the left image selected in Step SS409 to a left display target region. In this case, the vertical positions of right and left zoom windows to be displayed are not necessarily the same. Thereby, in Steps SS8 and SS306, the right and left zoom windows are displayed so as to overlap the oldest measurement point and corresponding point.

(2) If zoom window display regions are selected in Step SS405 and SS410, the window setting unit 43 sets a zoom window display region on the right image selected in Step SS405 to a right display target region. Additionally, if there is a zoom window display region having the same vertical position as the right display target region among the zoom window display regions selected in Step SS410, the window setting unit 43 sets the zoom window display region to a left display target region. Additionally, if there is no zoom window display region having the same vertical position as the right display target region among the zoom window display regions selected in Step SS410, the window setting unit 43 sets any of the zoom window display regions selected in Step SS410 to a left display target region. At this time, the same display target region as the current display target region may be preferentially selected. Thereby, in Step SS8 and SS306, the right zoom window is displayed so as to overlap the oldest corresponding point, and the left zoom window is displayed without overlapping the measurement point.

(3) If zoom window display regions are selected in Steps SS406 and SS409, the window setting unit 43 sets a zoom window display region on the left image selected in Step SS409 to a left display target region. Additionally, if there is a zoom window display region having the same vertical position as the left display target region among the zoom window display regions selected in Step SS406, the window setting unit 43 sets the zoom window display region to a right display target region. Additionally, if there is no zoom window display region having the same vertical position as the left display target region among the zoom window display regions selected in Step SS406, the window setting unit 43 sets any of the zoom window display regions selected in Step SS406 to a right display target region. At this time, the same display target region as the current display target region may be preferentially selected. Thereby, in Step SS8 and SS306, the left zoom window is displayed so as to overlap the oldest measurement point, and the right zoom window is displayed without overlapping the corresponding point.

(4) If zoom window display regions are selected in Steps SS406 and SS410, and if there are combinations with the same vertical position among the zoom window display regions on the right image selected in Step SS406 and the zoom window display regions on the left image selected in Step SS410, the window setting unit 43 sets the combinations to right and left display target regions. Additionally, if there is no combination with same vertical position, the window setting unit 43 sets any of the zoom window display regions selected in Step SS406 to a right display target region, and sets any of the zoom window display regions selected in Step SS410 to a left display target region. At this time, the same display target region as the current display target region may be preferentially selected. Thereby, in Steps SS8 and SS306, the right and left zoom windows are displayed without overlapping a measurement point and a corresponding point.

In Steps SS8 and SS306, zoom windows are displayed on the display target regions set in Step SS411. If a corresponding point or measurement point is included in a display target region, the image creating unit 45 creates a graphic image signal which makes the corresponding point or measurement point non-displayed.

Figure 21:
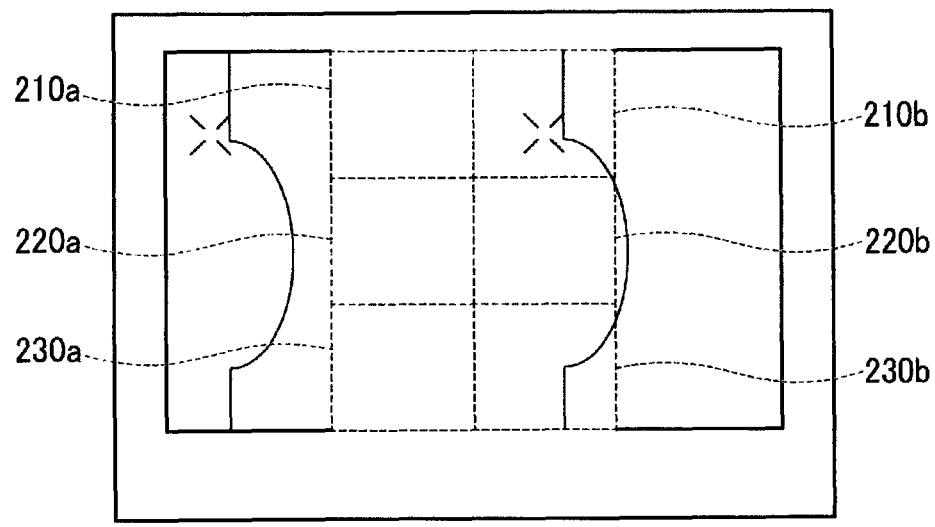
FIG. 21 is a reference view showing the zoom window display region in one embodiment of the present invention.

An example of setting a display target region will be described below using a concrete example. When the user further moves the cursor 120*a* to the upper part of the left image 110*a* after the state of FIG. 12, as in FIG. 21, a corresponding point exists on the right display target region 210*b*. For this reason, the right zoom window display regions 220*b* and 230*b* where no corresponding point exists are selected in Step SS406, and the left zoom window display regions 210*a*, 220*a*, and 230*a* where no measurement point exists are selected in Step SS410. In Step SS411, the zoom window display regions 230*a* and 230*b* are set to display target regions according to the above (4). Of course, the zoom window display regions 220*a* and 220*b* may be set to display target regions.

Figure 22:
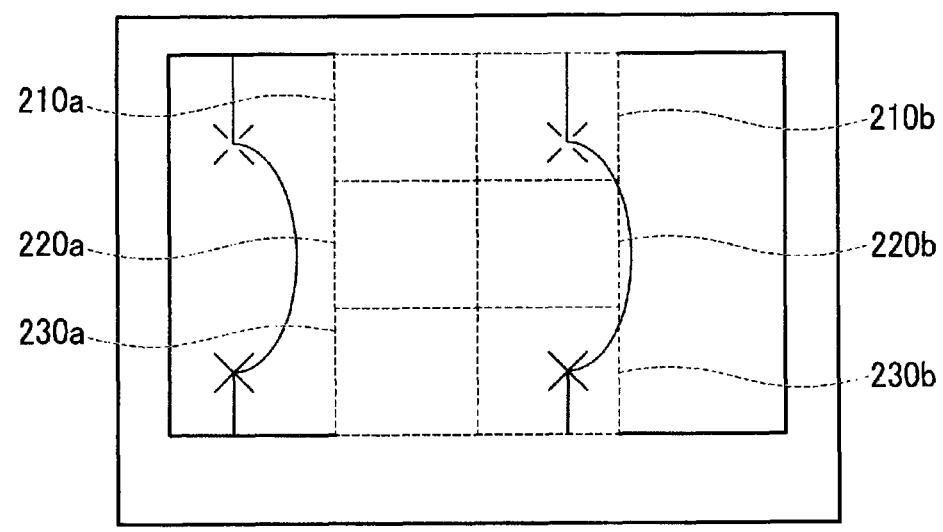
FIG. 22 is a reference view showing the zoom window display region in one embodiment of the present invention.

Additionally, when the user further moves the cursor 120*a* to the upper part of the left image 110*a* after the state of FIG. 15, as in FIG. 22, corresponding points exist on the right zoom window display regions 210*b* and 230*b*. For this reason, the right zoom window display region 220*b* where no corresponding point exists is selected in Step SS406, and the left zoom window display regions 210*a*, 220*a*, and 230*a* where no measurement point exists are selected in Step SS410. In Step SS411, the zoom window display regions 220*a* and 220*b* are set to display target regions according to the above (4).

Figure 23:
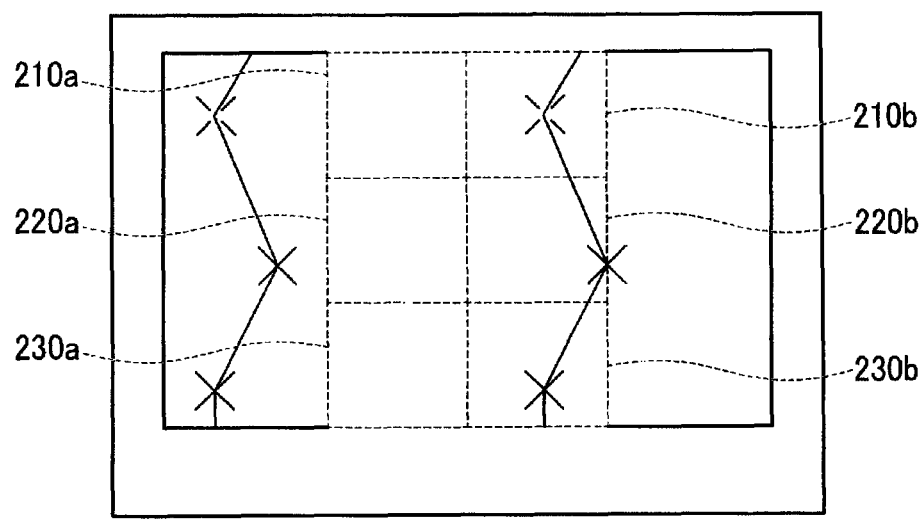
FIG. 23 is a reference view showing the zoom window display region in one embodiment of the present invention.

Additionally, when the user further moves the cursor 120*a* to the upper part of the left image 110*a* after the state of FIG. 18, as in FIG. 23, corresponding points exist on the right zoom window display regions 210*b*, 220*b*, and 230*b*. For this reason, the right zoom window display region 230*b* where the oldest corresponding point exists is selected in Step SS405, and the left zoom window display regions 210*a*, 220*a*, and 230*a* where no measurement point exists are selected in Step SS410. In Step SS411, the zoom window display regions 230*a* and 230*b* are set to display target regions according to the above (2).

Figure 24:
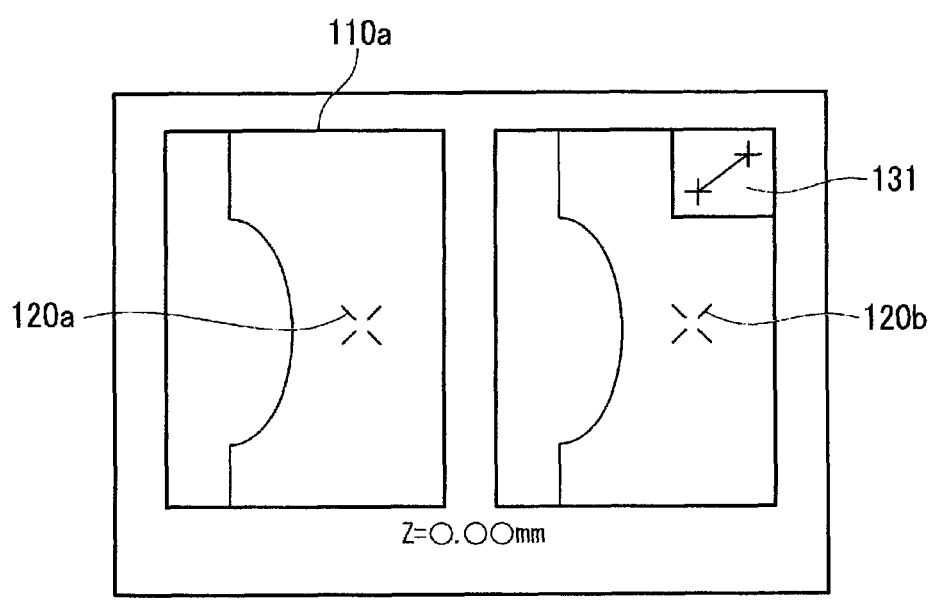
FIG. 24 is a reference view showing the display screen of the endoscope apparatus according to one embodiment of the present invention.
Figure 25:
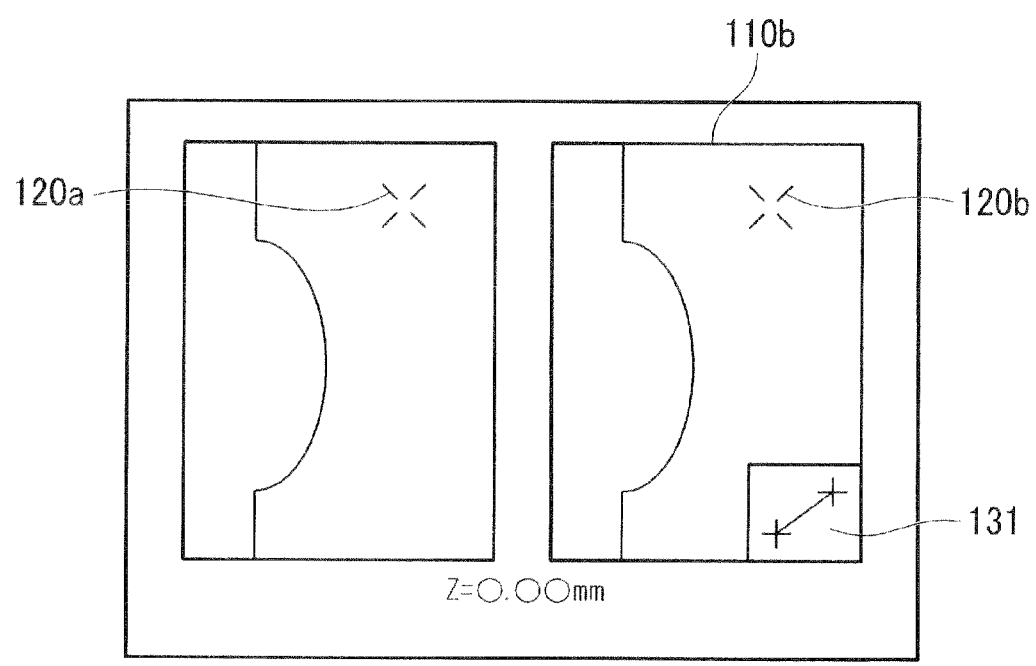
FIG. 25 is a reference view showing the display screen of the endoscope apparatus according to one embodiment of the present invention.

The same control as the above for zoom windows may be performed on other information display regions on a display screen. For example, the same control as the above may be performed on a measurement mode display icon 131 that is the second overlay shown in FIG. 24. The measurement mode display icon 131 shows the current measurement mode. In the present embodiment, only the measurement between the two points has been described. However, in a case where there is also a measurement mode of, for example, area calculation, the current measurement mode can be notified to a user, and the user is enabled to perform a suitable operation, by displaying the measurement mode display icon 131. If the user moves the cursor 120*a* to the upper part of the left image 110*a* and the cursor 120*b* overlaps the measurement mode display icon 131 after the state of FIG. 24, the measurement mode display icon 131 moves to the lower part of the right image 110*b* as in FIG. 25.

As described above, according to the present embodiment, it is possible to set an information display region, such as a zoom window, on a right image based on the position of a corresponding point on the right image, thereby controlling the positional relationship between the corresponding point and the information display region. Since this enables the information display region to be set at the position where the corresponding point is easily seen, the visibility of the corresponding point set on the right image can be maintained.

Additionally, the visibility of both the corresponding point and the information display region can be maintained by setting the information display region so that the corresponding point does not overlap the information display region.

Additionally, if a first corresponding point and a second corresponding point exist on the right image, the visibility of a first measurement point is sacrificed, but the visibility of a second measurement point can be maintained, by setting an information display region so that the information display region overlaps the first corresponding point and does not overlap the second corresponding point. This is effective especially when it is difficult to keep both the first corresponding point and the second corresponding point from overlapping the information display region. Moreover, the visibility of the information display region can be maintained by making the first measurement point overlapping the information display region non-displayed. Furthermore, if the first corresponding point is set ahead of the second corresponding point, the visibility of the second corresponding point which is newly set can be maintained.

Additionally, it is possible to set an information display region at a position where the measurement point is easily seen not only by setting an information display region on the right image based on the position of a corresponding point but also by setting an information display region on the left image based on the position of a measurement point. Thus, the visibility of the measurement point can also be maintained.

Additionally, when an information display region on the left image is set, not only the position of a measurement point is taken into consideration, but also the position of an information display region on the right image is taken into consideration, and the display positions of right and left information display regions are interlocked with each other. It is thereby possible to maintain, for example, the vertical positions of the right and left information display regions. Thus, the viewability of the right and left information display regions can be maintained.

That is, according to the present invention, it is possible to set an information display region on a second subject image based on the position of a corresponding point, thereby controlling the positional relationship between the corresponding point and the information display region. This enables the visibility of the corresponding point set in the second subject image to be maintained.

While the exemplary embodiments of the invention have been described with reference to the accompanying drawings, the detailed constitutions of the invention are not limited to the foregoing embodiments but embrace changes in design to the extent that they do not depart from the concept of the invention.

What is claimed is:

1. An endoscope apparatus comprising:
   an imaging unit which acquires image data containing a first image and a second image, the first image and the second image being about a same subject to be inspected;
   a measurement point setting unit which sets a measurement point on the first image;
   a corresponding-point setting unit which sets a corresponding point on the second image based on a position of the measurement point set by the measurement point setting unit;
   a region setting unit which interactively sets a first information display region on the first image based on a position of the measurement point set by the measurement point setting unit, and a second information display region on the second image based on a position of the corresponding point set by the corresponding-point setting unit;

a display unit which displays the first image, the second image, the measurement point, the corresponding point, the first information display region, and the second information display region; and a measuring unit which measures a subject using the image data based on the position of the measurement point and the position of the corresponding point, wherein the measurement point setting unit sets a first measurement point and a second measurement point, wherein the corresponding-point setting unit sets a first corresponding point corresponding to the first measurement point and a second corresponding point corresponding to the second measurement point, and wherein the region setting unit sets the second information display region so that the first corresponding point overlaps the second information display region, and so that the second corresponding point is at a different position than the second information display region.

2. The endoscope apparatus according to claim 1, further comprising a display control unit which performs control so that the first corresponding point is not displayed.

3. The endoscope apparatus according to claim 1, wherein the measurement point setting unit sets the second measurement point after the first measurement point is set.

4. The endoscope apparatus according to claim 1, wherein the region setting unit sets the first information display region based on the position of the measurement point set by the measurement point setting unit and the position of the second information display region, when the first information display region is set.

5. A measuring method using a computer, comprising:

acquiring image data containing a first image and a second image, the first image and the second image being about a same subject to be inspected;

setting a measurement point on the first image;

setting a corresponding point on the second image based on a position of the measurement point;

interactively setting a first information display region on the first image based on a position of the measurement point set by the measurement point setting unit, and a second information display region on the second image based on a position of the corresponding point;

displaying the first image, the second image, the measurement point, the corresponding point, the first information display region, and the second information display region on a display of the computer; and executing measuring processing using the image data based on the position of the measurement point and the position of the corresponding point, wherein setting the measurement point comprises setting a first measurement point and a second measurement point, wherein setting the corresponding point comprises setting a first corresponding point corresponding to the first measurement point and a second corresponding point corresponding to the second measurement point, and wherein the second information display region is set so that the first corresponding point overlaps the second information display region, and so that the second corresponding point is at a different position than the second information display region.

* * * * *